US012531929B2

(12) United States Patent
Luo

(10) Patent No.: US 12,531,929 B2
(45) Date of Patent: Jan. 20, 2026

(54) METHODS, DEVICES AND SYSTEMS FOR COMMUNICATIONS BETWEEN REAL WORLD WIRELESS DEVICES AND VIRTUAL WIRELESS DEVICES

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/450,198

(22) Filed: Aug. 15, 2023

(65) Prior Publication Data

US 2025/0063091 A1    Feb. 20, 2025

(51) Int. Cl.
*G06F 15/16* (2006.01)
*H04L 67/131* (2022.01)

(52) U.S. Cl.
CPC .................................. *H04L 67/131* (2022.05)

(58) Field of Classification Search
CPC .... H04L 63/08; H04L 63/0853; H04L 67/131
USPC ................................... 709/227–228; 726/3–4
See application file for complete search history.

(56) References Cited

U.S. PATENT DOCUMENTS

| 7,697,541 | B2 * | 4/2010 | He | H04L 45/502 |
| | | | | 370/389 |
| 8,862,732 | B2 * | 10/2014 | Bernstein | H04L 47/10 |
| | | | | 709/227 |
| 10,271,215 | B1 * | 4/2019 | Siraj | H04W 12/03 |
| 11,109,269 | B2 * | 8/2021 | Wu | H04W 28/06 |
| 12,289,156 | B2 * | 4/2025 | Bhargava | H04W 76/16 |
| 2020/0020136 | A1 * | 1/2020 | Hwang | G06F 40/109 |
| 2021/0192856 | A1 * | 6/2021 | Lee | G06T 19/20 |
| 2023/0396572 | A1 * | 12/2023 | Heikkinen | H04L 51/18 |
| 2024/0275826 | A1 * | 8/2024 | Bouazizi | H04L 65/1016 |
| 2024/0370358 | A1 * | 11/2024 | Ekmecic | G06F 11/3692 |
| 2025/0150899 | A1 * | 5/2025 | Cao | H04W 76/15 |

* cited by examiner

*Primary Examiner* — Bharat Barot

(57) ABSTRACT

A method can include a virtual/augmented reality (V/AR) access device receiving a list of virtual wireless devices within a predetermined virtual range. An upstream data frame from a real world wireless device can be encapsulated by the V/AR access device into an upstream packet and transmitted to a virtual wireless device. Downstream packets from the virtual wireless device can be decapsulated by the V/AR access device to access a downstream data frame. The downstream data frame can be transmitted to the real world wireless device by the V/AR access device. Corresponding devices and systems are also disclosed.

12 Claims, 21 Drawing Sheets

METHODS, DEVICES AND SYSTEMS FOR COMMUNICATIONS BETWEEN REAL WORLD WIRELESS DEVICES AND VIRTUAL WIRELESS DEVICES

TECHNICAL FIELD

The present disclosure relates generally to wireless systems, and more particular to wireless systems that can enable communication between real world wireless devices and virtual wireless device entities of a virtual or augmented reality environment.

BACKGROUND

Virtual reality environments can enable users to immerse themselves in virtual constructs while also interacting with such constructs as well as with one another. Augmented reality systems can superimpose constructs over views of a real world environment. In conventional systems, a user can access a virtual and/or augmented reality (V/AR) environment with a V/AR access device, such as a VR headset, VR glasses, a handheld computing device (e.g., smart phone or tablet) or a desktop system (e.g., desktop computer or gaming console).

Typically, a V/AR access device communicates with a V/AR system that updates and provides state information for the V/AR environment in response to user actions. Such communications can occur via network packets over a network, that usually includes the Internet (i.e., IP packets). Once a user has accessed a V/AR environment, communications within the environment can occur through packet transmissions with a V/AR server.

SUMMARY

Embodiments can include a system with a virtual and/or augmented reality (V/AR) access device that can serve as a relay between real world wireless devices and constructs functioning as wireless devices in the accessed V/AR environment (i.e., virtual wireless devices). A V/AR access device can receive a list of virtual wireless devices within a virtual proximity, including their communication protocol type, and attempt to connect with each such virtual wireless device. The V/AR access device can also authenticate and connect with real world devices. Upstream data frames from a real word wireless device, destined for a virtual wireless device of the same protocol, can be encapsulated into a network packet by the V/AR access device and forwarded to the virtual wireless device. Downstream packets from a virtual wireless device, destined for a real world wireless device of the same protocol, can be decapsulated by a V/AR access device to provide a data frame that can be forwarded to the real world device.

DETAILED DESCRIPTION

Figure 1:
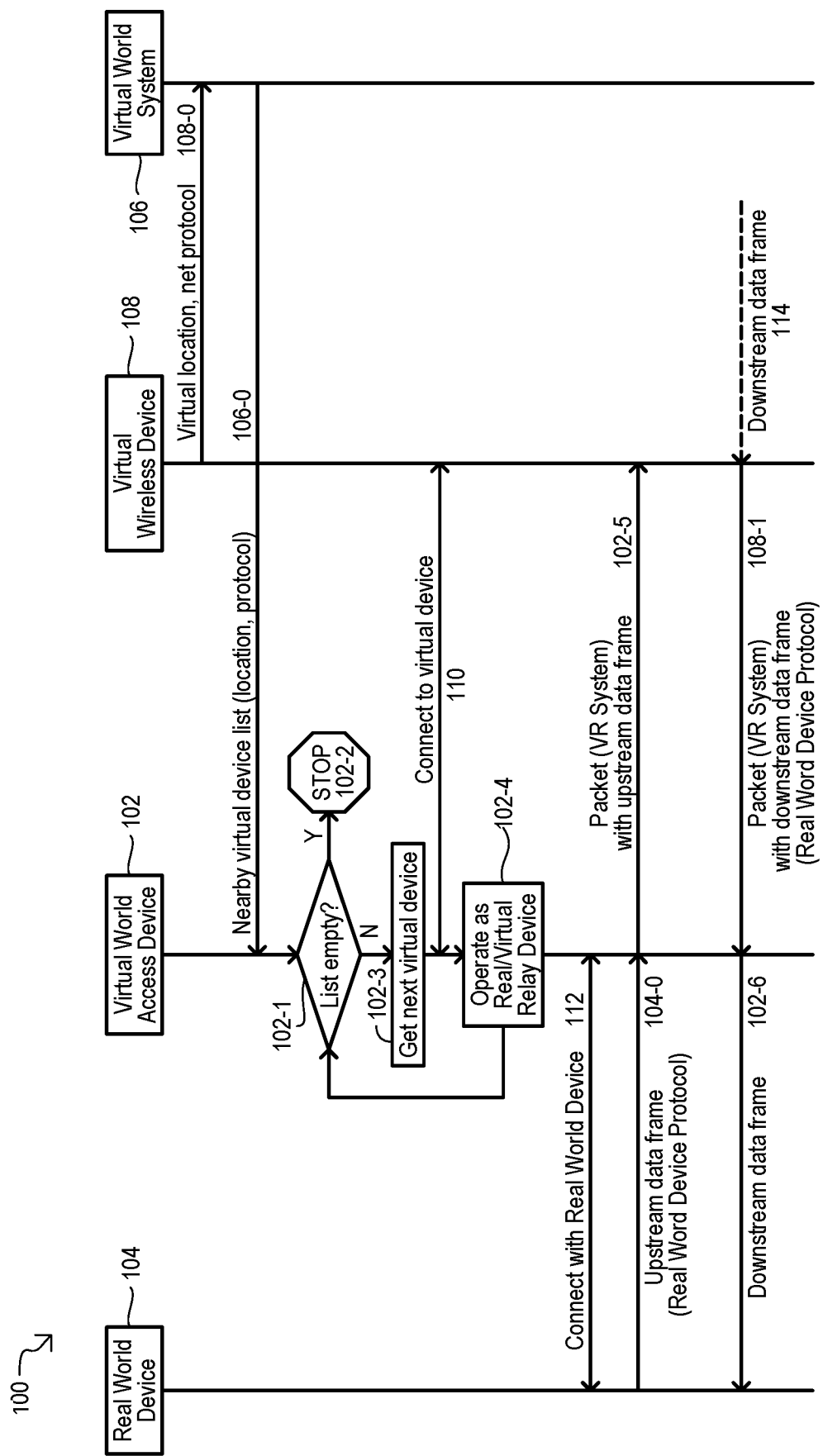
FIG. 1 is a diagram of a system for relaying communications between real world wireless devices and virtual wireless devices according to an embodiment.

According to embodiments, a device used to access a virtual and/or augmented reality (V/AR) environment can enable real world wireless devices to network with virtual wireless devices of the V/AR environment. Virtual wireless devices can be constructs of the V/AR environment that can emulate or operate according to real world communication standards. A V/AR access device can present instances of virtual wireless devices to real world wireless devices to relay communications between real world wireless devices and the virtual wireless devices.

In some embodiments, a V/AR access device can receive data frames from real world devices, encapsulate them into packets suitable for communication with a V/AR system, and transmit them to the V/AR system. In some embodiments, such packets can include data link layer information for a real world device embedded in the payload of a network layer packet.

In some embodiments, a V/AR access device can receive packets from virtual devices via the communication method for the V/AR system (e.g., IP packets). Such packets can be decapsulated to reveal a data frame suitable for transmission to a target real world wireless device.

In some embodiments, real world wireless devices and virtual wireless devices can communicate according to one or more existing wireless standards, including but not limited to: one or more IEEE 802.11 wireless standards, one or more Bluetooth standards, one or more Zigbee standards, as well as peer-to-peer standards, such as Wi-Fi Aware (or Wi-Fi direct).

According to embodiments, a V/AR server (e.g., a "metaverse" server) can manage a database of virtual wireless devices of a V/AR environment (e.g., a "metaverse"). Each virtual wireless device can have a virtual location attribute and networking protocol attribute. A virtual location attribute can identify its virtual position in a V/AR environment. A networking protocol attribute can identify how to connect to the virtual wireless device. When a virtual wireless device is "turned on" (e.g., made active in the V/AR environment), it can periodically report its virtual location and networking protocol to the database until it is "turned off".

Also according to embodiments, a user V/AR access device, such as a VR headset or goggles, can have a wireless device that can relay information between the wireless devices in the real world near the user and the virtual wireless devices in the user's virtual proximity in the V/AR environment. The V/AR access device can also have a location attribute identifying the user's virtual place in a V/AR environment relative to the virtual wireless devices.

A V/AR access device can periodically query a database of a V/AR system to find all virtual wireless devices in a virtual proximity of the user's virtual location in the V/AR environment. In response, the V/AR access device can start or stop relaying traffic between the wireless devices in the real world near the user and the virtual wireless devices, via the networking protocols identified by these virtual wireless devices, as the virtual wireless device moves in or out of virtual proximity of the user's virtual location. The V/AR access device may register a list of such virtual wireless devices in the virtual proximity of the user's virtual location with the database. When any virtual wireless device on the list moves in or out of the virtual proximity of the user's virtual location, the database can send a notification to the V/AR access device, triggering it to start or stop relaying traffic.

FIG. 1 is a diagram showing a system 100 according to an embodiment. A system 100 can include a V/AR access device 102, a real world wireless device 104, a V/AR system 106 and a virtual wireless device 108. A V/AR access device 102 can be a device operated by a user to access a V/AR environment presented by V/AR system 106. Such a device can take any suitable form, including but not limited to: headsets, glasses, goggles, handheld computing devices, desktop computing systems, or console systems. A VA/R access device 102 can include communication circuits for communicating with a VA/R system 106 (which can be wireless or wired) as well as wireless communication circuits for communicating with real world wireless devices (e.g., 104). A VA/R access device 102 can also include, or have access to, hardware for presenting (e.g., rendering) the V/AR environment in response to data received from a V/AR system 106.

A real world wireless device 104 can be a wireless device that can operate according to any of the wireless standards described herein, or equivalents. Thus, a wireless device 104 can include wireless circuits for receiving and transmitting data frames according to one or more real world standards, with virtual wireless device 108 capable of processing data frames of the same real world standard.

A V/AR system 106 can include one or more computing devices for generating data of a V/AR environment for VA/R access device 102. A V/AR system 106 can include any suitable system, including one or more server systems connected to the Internet. A V/AR system 106 can maintain data on virtual locations of various objects in a V/AR environment, including by not limited to: virtual locations of virtual wireless device 108 and V/AR access device 102.

A V/AR system 106 can determine which virtual wireless devices (e.g., 108) are within a virtual proximity to V/AR access device 102. Such a virtual proximity can take any suitable form. In some embodiments, a virtual proximity can vary according to a V/AR environment. Objects in a same virtual region of a V/AR environment can be within virtual proximity of one another. The physics or other rules dictating interaction in the V/AR environment can determine virtual proximity. A rendering limitation or setting for a V/AR access device can determine virtual proximity (e.g., if a virtual wireless device is visible to a user of a V/AR access device 102, it can be determined to be within virtual proximity). In addition or alternatively, a virtual proximity can include real-world performance factors. A transmission rate of packets, or other connection rating for communications between a V/AR access device 102 and a virtual wireless device 108, can be used to determine whether virtual wireless devices are within virtual proximity of one another.

A virtual wireless device 108 can be an object, or other construct in a V/AR environment that can process communications according to a same real world standard as that used by real world wireless device 104. In some embodiments, a virtual wireless device 108 can access a data frame encapsulated within a network packet, as well as generate data frames for processing by real world wireless device 104. In some embodiments, such generated data frames can be encapsulated in a network packet for transmission to a real world wireless device 104 (via V/AR access device 102).

A virtual wireless device 108 can be controlled by, or be part of, V/AR system 106. In addition or alternatively, a virtual wireless device 108 can be generated or controlled, in full or in part, by a user or some other entity in communication with the V/AR system 106. In some embodiments, a virtual wireless device 108 can be created or summoned through user action. In some embodiments, a virtual wireless device can move within a V/AR environment (i.e., change its virtual position).

Having described various components of a system 100, operations of a system 100 will now be described.

Action 108-0 can include a virtual location of a wireless device being reported to a V/AR system. In some embodiments, such an action can include internal V/AR system 106 operations, with a virtual location of virtual wireless device 108 being updated or altered according to a V/AR environment. However, in other embodiments such an action can include a virtual wireless device 108 transmitting an information packet to a V/AR system 106.

Action 106-0 can include a V/AR system 106 transmitting a list of virtual wireless devices within a virtual proximity of V/AR access device 102. Such a list can include some identifier for each virtual wireless device, as well as one or more associated real world communication standards. In some embodiments, such an action can include a V/AR system 106 transmitting one or more packets to a V/AR access device 102 over a network (e.g., the Internet). In some embodiments, a V/AR access device 102 can report a current list of virtual wireless devices and its virtual location to a V/AR system 106. In response, action 106-0 can include a V/AR system 106 notifying a V/AR access device 102 of virtual wireless devices that are no longer within a virtual proximity (and hence should be removed from the list) and/or notifying the V/AR access device 102 of new virtual wireless devices that are now within a virtual proximity (and hence should be added to the list).

Upon receiving a list of virtual wireless devices, a V/AR access device 102 can process such a list until, or if, such a list is empty (Y from 102-1). When a list is empty, V/AR access device 102 can stop relay operations 102-2. If a list is not empty (N from 102-1), for each virtual wireless device 102-3, a V/AR access device 102 can attempt to make a connection 110.

Action 110 can include a V/AR access device 102 attempting to create a connection with a virtual wireless device 108 from a list provided from V/AR system 106. Creating a connection 110 can include authentication operations to ensure the identity of a V/AR access device 102. Such authentication can include any suitable method, including use of a public key infrastructure and/or two factor authentication. In some embodiments, creating a connection can include a V/AR access device 102 and a virtual wireless device 108 exchanging packets encapsulating data frames compatible with a mutually known, real world wireless standard. For connected virtual wireless devices, a V/AR access device 102 can operate as a relay device 102-4.

Action 112 can include a V/AR access device 102 connecting with a real world device 104. Such an action can include exchanging data frames according to the appropriate real world standard (which can be the same standard as that associated with virtual wireless device 108). Such an exchange can include authentication according to the real world standard. In some embodiments, such an action can result in real world device 104 receiving information on all suitable (i.e., operating according to the same wireless standard) virtual wireless devices connected to V/AR access device 102.

Once a V/AR access device 102 has established connections with virtual and real world wireless devices (e.g., 108 and 104), communications can occur between such devices according to the common wireless communication standard. Such communications can include upstream communications, from a real world wireless device 104 to a virtual wireless device 108, as well as downstream communications, from a virtual wireless device 108 to a real world wireless device 104. Upstream communications can include action 104-0, the transmission of a data frame from real world device 104 to V/AR access device 102, in the real world, and according to a real world standard. Upstream communications can also include action 102-5, the transmission of a packet from V/AR access device 102 to virtual wireless device 108. Such a packet can include the data frame provided from real world device 104 encapsulated within.

Downstream communications can include action 108-1, a packet with a data frame being provided from virtual wireless device 108 to V/AR access device 102. A V/AR access device 102 can extract the data frame from the received packet and transmit the data frame to the real world device (action 102-6). Optionally, a data frame provided in a packet from a virtual wireless device can itself have been a data frame 114 provided from another source in a V/AR environment, including from another virtual wireless device, or even another V/AR access device.

In this way, a system can include a V/AR access device to enable wireless communications between wireless devices of the real world and virtual wireless devices of a V/AR environment.

While embodiments can include real life and virtual wireless devices communicating according to any suitable wireless standard, some embodiments can operate according to one or more IEEE 802.11 wireless standards or other Wi-Fi related standards such as Wi-Fi Aware or Wi-Fi Direct (referred to herein as Wi-Fi, but not being construed as limiting to any particular standard).

According to embodiments, a Wi-Fi station device (STA) in the real world can connect to a Wi-Fi AP in a V/AR environment (a virtual AP). When a virtual AP is "turned on" in a V/AR environment, it can report its virtual location and networking protocol (e.g., a TCP/UDP port and an IP address) to a dedicated database for tracking virtual Wi-Fi devices in a V/AR environment. A user V/AR access device can query the database of virtual Wi-Fi devices with a user virtual location as input, and can obtain a location-and-protocol list of virtual Wi-Fi devices in the user's virtual proximity, which can include a virtual AP.

A user V/AR access device can contact a virtual AP via the specified networking protocol, and get its public parameters, such as a service set identifier (SSID) and authentication and key management data (AKM). The V/AR access device can then proceed with authentication with the virtual AP. If the authentication fails, a V/AR access device can try the same process with a next virtual AP in the list; and otherwise continue.

According to embodiments, for an authenticated virtual AP, a user V/AR access device can turn on, or otherwise enable, an instance of its Wi-Fi device as an access point device (AP) (called an AP instance). Such an AP instance can use the virtual AP's SSID as its SSID, but using AKM data that has been used between the V/AR access device and real world Wi-Fi devices, such as WPA3 SAE AKM, as but one example. In such an arrangement, real world Wi-Fi devices near the user can connect to the AP instance, and the AP instance can relay data frames from the real world Wi-Fi device by encapsulating their Wi-Fi frames into IP packets between the real world Wi-Fi devices and the virtual APs.

In some embodiments, a virtual AP can maintain a look-up table for every real world Wi-Fi device with which it communicates. Such a look-up table can map MAC addresses of every such real-world Wi-Fi device to the AP instance's IP address, so that the virtual AP can send back downstream Wi-Fi frames to every real-world Wi-Fi device on the look-up table.

In some embodiments, if a virtual AP supports IP networking for the real-world Wi-Fi devices, the virtual AP can also serve as a DHCP server as well as the default router. In such a role, real world Wi-Fi devices can get IP addresses from the virtual AP, and connect to the Internet or an intranet in the V/AR environment via the virtual AP.

In some embodiments, when a user V/AR access device finds the user has become out of virtual range from the virtual AP, it can turn off, or otherwise disable the corresponding AP instance. Real world Wi-Fi devices can then lose the connection with the AP instance as well as the virtual AP.

In some embodiments, a V/AR access device can turn on an AP instance for each virtual AP on a received list, until all available instances of the V/AR access device are used.

Figure 2:
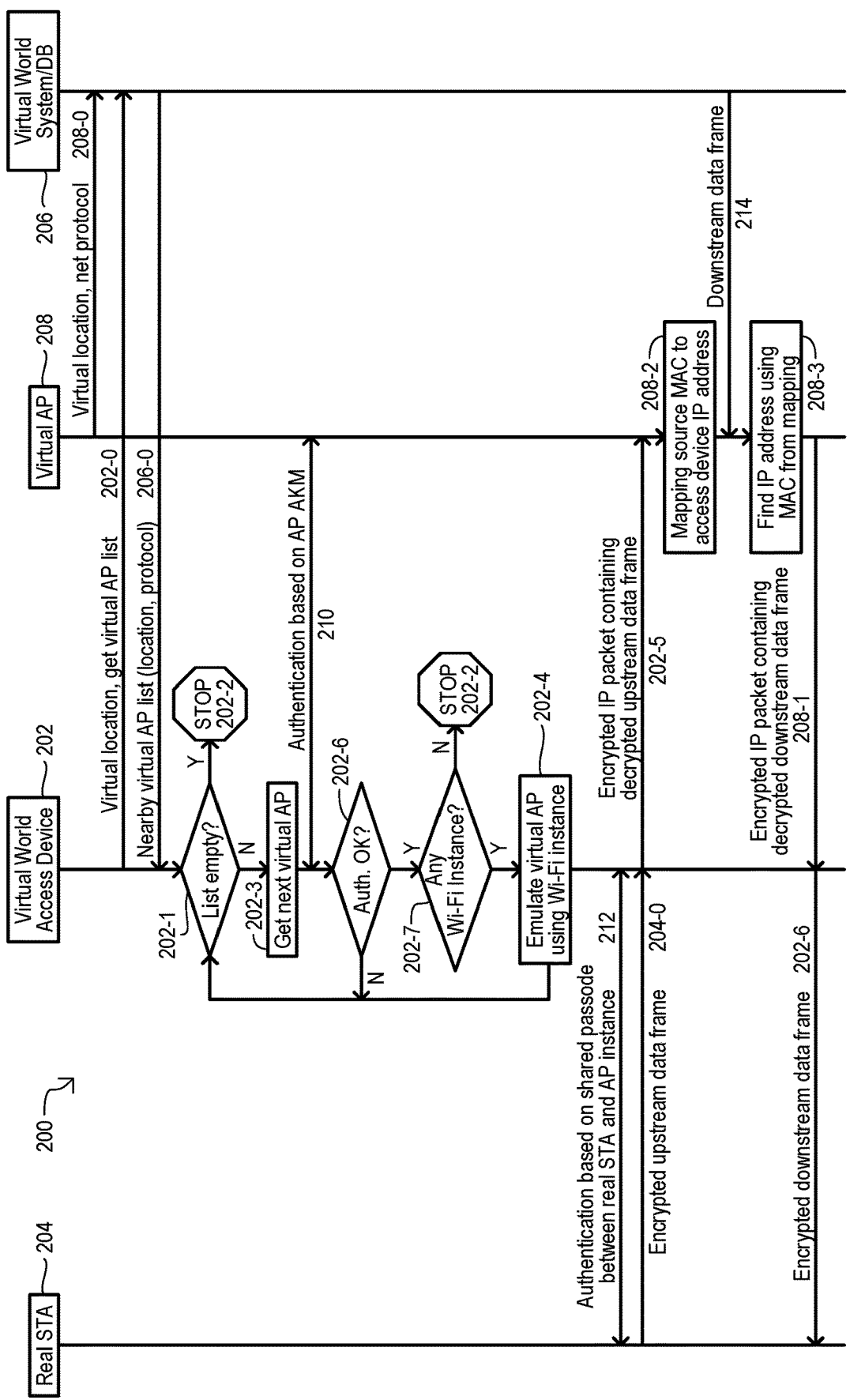
FIG. 2 is a diagram of a system for relaying communications between real world Wi-Fi wireless devices and virtual Wi-Fi wireless devices according to an embodiment.

FIG. 2 is diagram of a system 200 according to another embodiment. A system 200 can include a V/AR access device 202, a real world station device (STA) 204, a V/AR system/database (DB) 206 and a virtual access point device (AP) 208. A V/AR access device 202 can take the form of any of those described herein and can include Wi-Fi compatible wireless circuits. A real world STA 204 can be a Wi-Fi compatible STA.

A V/AR system 206 can take the form of any of those described herein, including one or more computing devices and one or more databases for maintaining a V/AR environment. A V/AR system 206 database can include virtual locations of virtual APs and V/AR access devices, as well as identification and protocol information for virtual APs.

A virtual AP 208 can take the form of a virtual wireless device, as described herein or equivalents, and operate according to one or more Wi-Fi standards.

Operations of a system 200 will now be described.

A virtual AP 208 can provide location and protocol information to a V/AR system 206 (action 208-0). Such an action can include any of those described for virtual wireless devices herein, or equivalents.

A V/AR access device 202 can transmit its location to a V/AR system 206 and request a list of local virtual APs (action 202-0). In response to such a transmission, a V/AR system 206 can determine which virtual APs are within a virtual proximity to the virtual location reported by the V/AR access device 202. The V/AR system 206 can compile a list of any such virtual APs and transmit the list to the V/AR access device 202 (action 206-0). Such a list can include any of: identifying information for the virtual APs (e.g., addresses, names), communication protocol information (e.g., standards by which it can communicate) and virtual location information. In some embodiments, a list can include not only virtual APs, but devices operating according to other protocol (e.g., Bluetooth, Zigbee, etc.).

Upon receiving a list of virtual APs within a virtual proximity, a V/AR access device 202 can determine if such a list is empty (202-1). If a list is empty (Y from 202-1), a V/AR access device 202 can stop relaying functions 202-2. If a list is not empty (N from 202-1), a V/AR access device 202 can select a virtual AP (action 202-3) from the list 202-3 and attempt to connect with the virtual AP 208 (action 210). Such a connection attempt can be according to a protocol specified by the virtual AP 208. In some embodiments, action 210 can include a V/AR access device 202 determining a SSID for the virtual AP 208, as well as the execution of an authentication operation, such as AKM based authentication, with AKM values generated between V/AR access device 202 and virtual AP 208. If a virtual AP 208 cannot be authenticated (N from 202-6), a V/AR access device 202 can continue to process the provided list (return to 202-1).

If a virtual AP 208 can be authenticated (Y from 202-6), a V/AR access device 202 can determine if any Wi-Fi instances exist for virtual APs 202-7. If no Wi-Fi instances exist (N from 202-7) a V/AR access device 202 can stop the relaying function 202-2. If a Wi-Fi instance exists (Y from 202-7), a V/AR access device 202 can emulate the virtual IP using a Wi-Fi instance 202-4. Such a Wi-Fi instance 202-4 can present the SSID of a corresponding virtual AP 208 to real world Wi-Fi devices.

According to embodiments, connections can be made between Wi-Fi instance(s) of the V/AR access device 202 and a real world STA 204 (action 212). Such an action can include presenting the SSID of the corresponding virtual AP but can use authentication protocols/values of the V/AR access device 202 (e.g., WPA3 SAE AKM). Once a real world STA 204 has been successfully authenticated with a Wi-Fi instance of the V/AR access device 202, communications can be relayed between real world STA 204 and a virtual AP 208.

In the embodiment shown, an upstream relay operation can include a real world STA 204 transmitting an encrypted data frame to a Wi-Fi instance of V/AR access device 202 (action 204-0). The Wi-Fi instance of V/AR access device 202 can decrypt the received data frame, and include it (e.g., encapsulate it) within an IP packet having an address corresponding to the virtual AP 208. Virtual AP 208 can receive the encapsulating IP packet, and from the data frame included therein, determine a MAC address for the sending real world STA 204. For each received relayed IP packet, a virtual AP 208 can map the MAC address for the corresponding real world STA 204 to the IP address of the Wi-Fi instance in the V/AR access device 202 (action 208-2).

In the embodiment shown, a downstream relay operation can include a virtual AP 208 receiving downstream data frames (action 214). Such downstream data frames can be received from a source within a V/AR environment (e.g., via V/AR system 206). However, an origin of the data frame can be another real world device. Upon receiving a downstream data frame, a virtual AP 208 can find an IP address corresponding to a Wi-Fi instance based on the destination MAC address (action 208-3). If a received downstream data frame is encrypted, it can be decrypted by a virtual AP. A virtual AP 208 can generate an encrypted IP packet having an IP destination address of the corresponding Wi-Fi instance run by V/AR access device 202 (action 208-1). Upon receiving the encrypted IP packet, the Wi-Fi instance can decrypt the packet to access the encapsulated data frame. A V/AR access device can then encrypt the data frame and transmit it to the destination real life STA 204 (action 202-6).

In this way, upon connecting with a virtual AP entity in a V/AR environment, a V/AR access device can create a corresponding Wi-Fi instance for relaying data frames in the real world as IP packets to a virtual AP, and vice versa.

While embodiments can include real life and virtual wireless devices communicating according to any suitable wireless standard, some embodiments can relay real world devices operating according to one or more Bluetooth standards to "virtual" Bluetooth devices.

According to embodiments, a real world Bluetooth central device can connect to a virtual Bluetooth peripheral device in a V/AR environment. When a virtual Bluetooth Peripheral device is "turned on" (or otherwise enabled) in a V/AR environment, it can report its virtual location and networking protocol (e.g., a TCP/UDP port and an IP address) to a dedicated database of a V/AR system for tracking virtual Bluetooth peripheral devices in the V/AR environment. A user V/AR access device can query such a database with its virtual location as input and can obtain a location-and-protocol list of all virtual BLE peripheral devices in a virtual proximity to a V/AR access device.

A user V/AR access device can contact a virtual Bluetooth peripheral device via the specified networking protocol and acquire its public parameters including advertisement message. It can then proceed with authentication using a shared PIN stored in a Bluetooth pairing profile. If the authentication fails, the V/AR access device can try the same process with a next virtual Bluetooth peripheral device on the list.

In response to a pairing with a virtual Bluetooth peripheral device, a V/AR access device can turn on (or otherwise enable) a Bluetooth instance, broadcasting the virtual Bluetooth peripheral device's advertisement message, and using its PIN for pairing and authentication. A real world Bluetooth central device near V/AR access device can connect to the Bluetooth Peripheral instance, and the Bluetooth peripheral instance can relay data traffic between the real world Bluetooth central device and the virtual Bluetooth Peripheral device.

When a user V/AR access device determines a user is out of virtual range from a virtual Bluetooth peripheral device, it can turn off the Bluetooth peripheral instance, and the real world Bluetooth central device can lose the connection with the Bluetooth peripheral instance as well as the virtual Bluetooth peripheral device.

In some embodiments, a V/AR access device can turn on a Bluetooth instance for each virtual Bluetooth peripheral device on a received list, until all instances of the V/AR access device are used.

Figure 3:
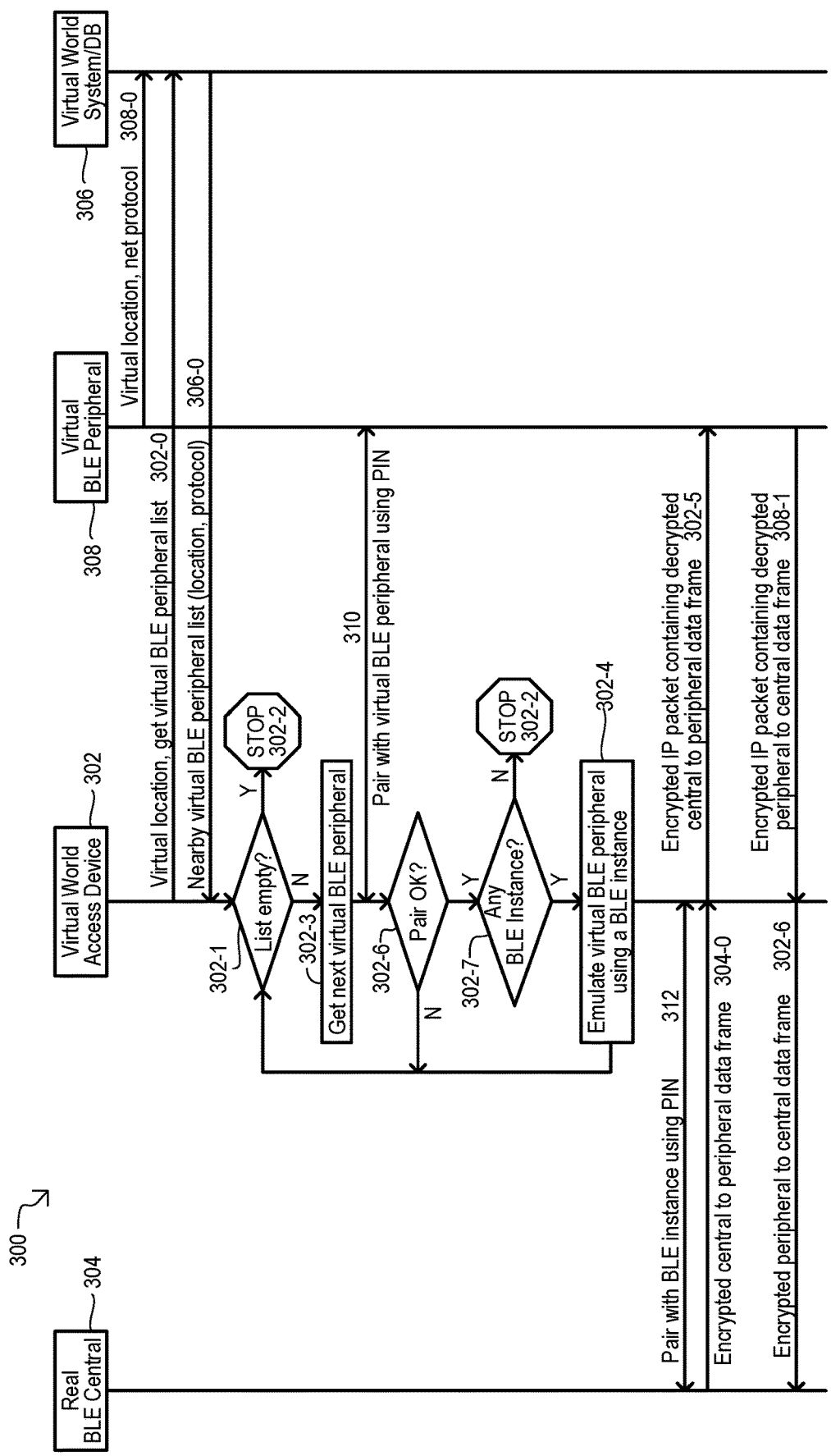
FIG. 3 is a diagram of a system for relaying communications between real world Bluetooth compatible wireless devices and virtual Bluetooth compatible wireless devices according to an embodiment.

FIG. 3 is diagram of a system 300 according to another embodiment. A system 300 can include a V/AR access device 302, a real world BLE central device 304, a V/AR system/database 306 and a virtual BLE peripheral device 308. While devices are referred to as BLE devices, embodiments can operate according to any suitable Bluetooth standard. A V/AR access device 302 can take the form of any of those described herein and can include BLE compatible wireless circuits. A V/AR system 306 can take the form of any of those described herein and can store virtual locations of virtual BLE peripheral devices and their protocol information. A virtual BLE peripheral device 308 can take the form of a virtual wireless device, as described herein or equivalents, and can operate according to a BLE standard.

Operations of a system 300 can generally follows those described for FIG. 2, but with the real world protocol and emulated protocol being BLE. Accordingly, a virtual BLE peripheral 308 can report its virtual location and indicate a BLE standard as its protocol (308-0). A V/AR access device can request and receive a list that includes virtual BLE peripheral devices in a virtual proximity (302-0, 306-0).

If a list is not empty (N from 302-1), a V/AR access device 302 can select a virtual BLE peripheral device (action 302-3) from the list 302-3 and attempt to pair with it (action 310). Such an action can include a V/AR access device 302 advertising message and authentication procedure, which can use a PIN stored in a public pairing profile. If a pairing fails (N from 302-6), a V/AR access device 302 can continue to process the provided list (302-1).

Once there is a successful pairing with a virtual BLE peripheral device (Y from 302-6), a V/AR access device 302 can determine if any BLE instances exist for virtual BLE peripheral devices. If no such instances exist (N from 302-7) a V/AR access device 302 can stop the relaying function 302-2. If a BLE instance exists (Y from 302-7), a V/AR access device 302 can emulate the virtual BLE peripheral device using a BLE instance 302-4. A BLE instance 302-4 can broadcast an advertising message of a corresponding virtual BLE peripheral device 308, as well as use its PIN for pairing and authentication.

According to embodiments, connections can be made between BLE instance(s) of the V/AR access device 302 and a real world BLE central device 304 (action 312).

In the embodiment shown, an upstream relay operation can include a real world BLE central device 304 transmitting an encrypted central-to-peripheral data frame to V/AR access device (action 304-0). The BLE instance of V/AR access device 302 can decrypt the received data frame, and include it (e.g., encapsulate it) within an IP packet having an address corresponding to the virtual BLE peripheral device 308 (action 302-5).

In the embodiment shown, a downstream relay operation can include a virtual BLE peripheral device 308 generating an encrypted IP packet having an IP destination address of the corresponding BLE instance run by V/AR access device 302 (action 308-1). Upon receiving the encrypted IP packet, the BLE instance can decrypt the packet to access the data frame. A V/AR access device can then encrypt the data frame and transmit it to the destination real life BLE central device 304 (action 302-6).

In this way, upon connecting with a virtual BLE entity in a V/AR environment, a V/AR access device can create a corresponding BLE instance for relaying data frames in the real world as IP packets to a virtual BLE device, and vice versa.

Figure 4A:
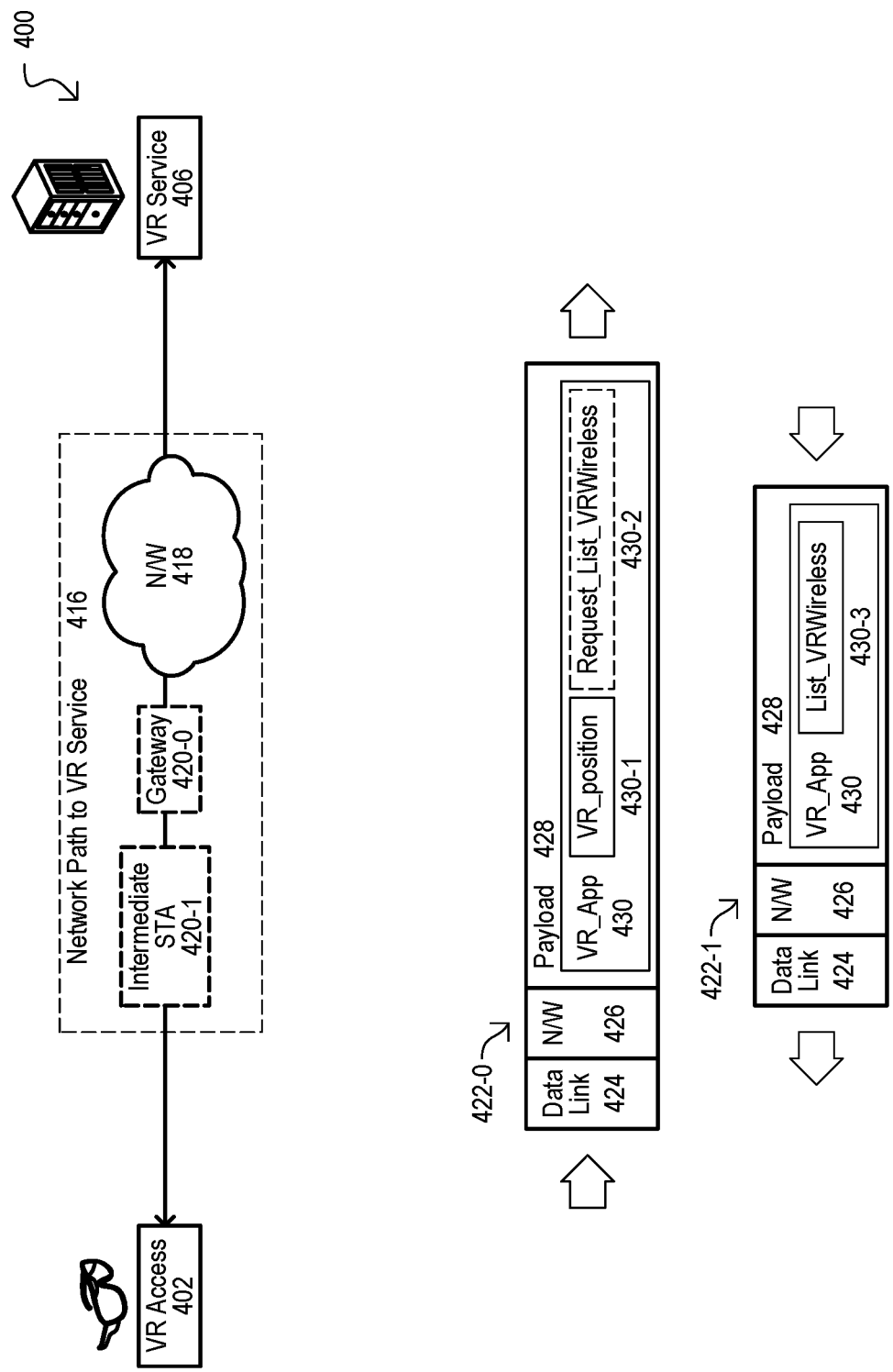
FIGS. 4A and 4B are diagrams showing a system and communications according to an embodiment.
Figure 4B:
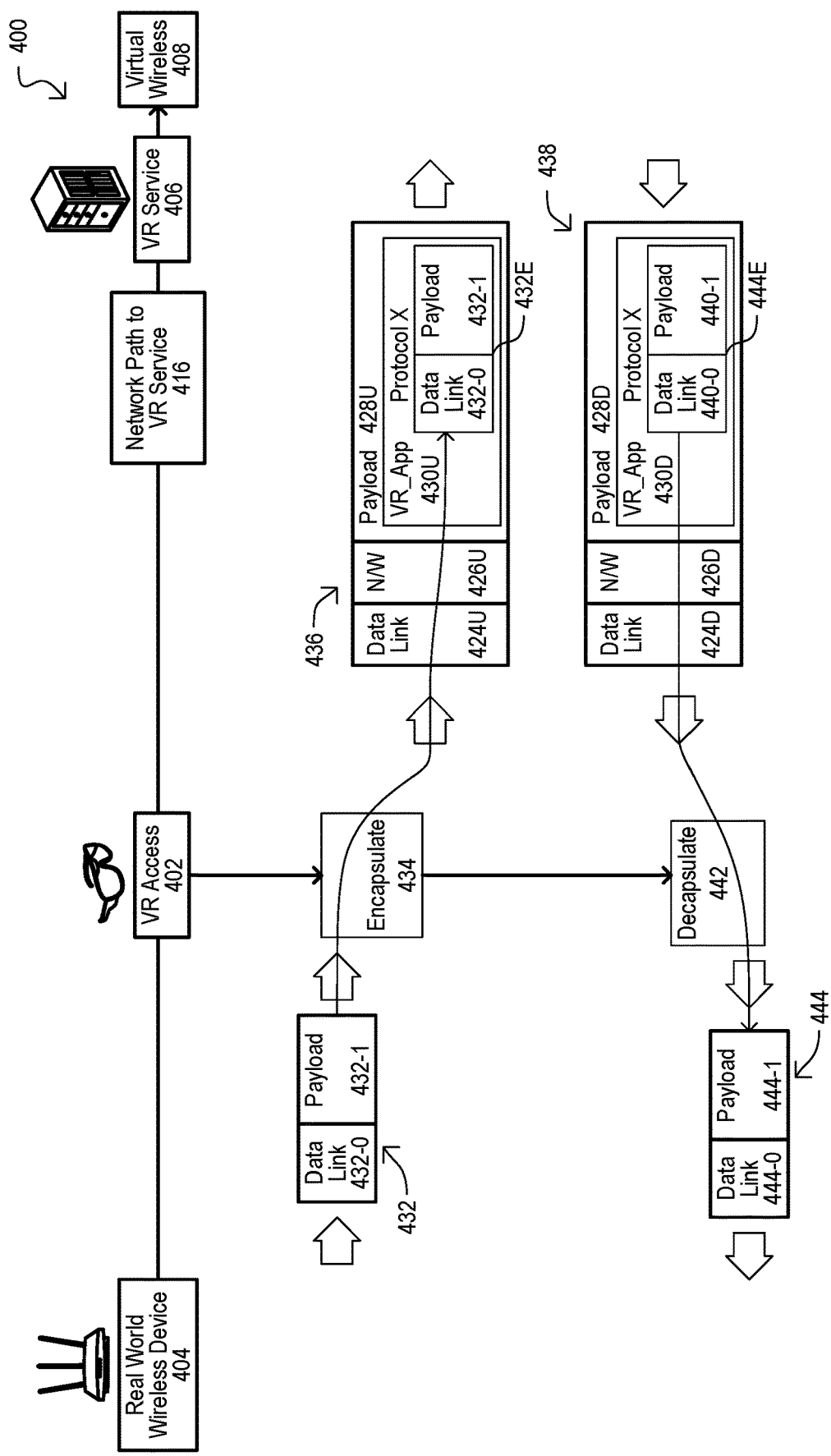

Embodiments can include V/AR access devices that can encapsulate data frames into packets for transmission to virtual wireless devices and decapsulate packets from virtual wireless devices to access a data frame therein. FIGS. 4A and 4B show encapsulation and decapsulation operations according to an embodiment.

FIG. 4A shows a system 400 and corresponding communications according to an embodiment. Such communications can be those preparatory to relaying communications between real world and virtual wireless devices. A system 400 can include a V/AR access device 402, a V/AR service 406, and a network path 416. A V/AR access device 402 can take the form of any of those described herein or equivalents. A V/AR service 406 include functions provided by a V/AR system as described herein or equivalents.

A network path 416 can include a network 418, and optionally, one or more devices that can connect to the network 418. Such optional devices can include, but are not limited to, an intermediate STA 420-1 and/or a gateway device 420-0. A network 418 can include any suitable network for providing communications between V/AR access devices and V/AR system(s), including but not limited to LAN, MAN and/or WAN, as well as the Internet.

A V/AR access device 402 can transmit a position packet 422-0 suitable for transmission over network path 416 to V/AR service 406. A position packet 422-0 can include various fields, including but not limited to, data link layer information 424, network layer information 426 and a payload 428. Data link layer information 424 can enable transmission of position packet 422-0 to a next point in a network path 416. Network layer information 426 can direct position packet 422-0 to VR service 406. Payload 428 can include data related to a V/AR application 430, which can include a virtual position 430-1 of a user within a V/AR environment. In some embodiments, position packet 422-0 can include a request for information for virtual wireless devices within a virtual proximity 430-2.

A V/AR service 406 can transmit a list packet 422-1 suitable for transmission over network path 416 to V/AR access device 402. A list packet 422-1 can include various fields like those of position packet 422-0. Data link layer information 424 can enable transmission of position packet 422-0 to a next point in a network path 416. Network layer information 426 can direct list packet 422-1 to V/AR access device 402. Payload 428 can include data related to a V/AR application 430, which can include a list of virtual wireless devices 430-3, which can be those virtual wireless devices within a virtual proximity of a V/AR access device 402 user. A list of virtual wireless devices 430-3 can take the form of any of those described herein or equivalents.

In this way, a V/AR service device 406 can report its virtual position to a V/AR service 406 and receive a list of virtual wireless devices that are within a virtual proximity.

FIG. 4B shows a system 400 and corresponding communications according to an embodiment. Such communications can include the relaying of communications between real world and virtual wireless devices. A system 400 can include a V/AR access device 402, a V/AR service 406, a real world wireless device 404, a virtual wireless device 408 and network path 416. Such items can take form of those described herein or equivalents.

In FIG. 4B, it is assumed that V/AR access device 402 has established a connection with virtual wireless device 408 and real world wireless device 404 according to any of the methods described herein or equivalents.

A real world wireless device 404 can transmit an upstream data frame 432 to a wireless device instance of V/AR access device 402 that can emulate virtual wireless device 408. Upstream data frame 432 can include data link layer information 432-0 and payload 432-1. Data link layer information 432-0 can direct packet to the wireless device instance in V/AR access device 402. Payload 432-1 can be data intended for virtual wireless device 408.

Upon receiving upstream data frame 432, a wireless device instance within V/AR access device 402 can encapsulate 434 the data frame into an upstream packet 436 suitable for transmission over network path 416 to V/AR service 406 and/or virtual wireless device 408. An upstream packet 436 can include various fields, including but not limited to, data link layer information 424U, network layer information 426U and a payload 428U. Data link layer information 424U can enable transmission of upstream packet 436 to a next point in a network path 416. Network layer information 426U can direct upstream packet 436 to virtual wireless device 408. Payload 428U can include the payload 432-1 of the upstream data frame 432, and in some embodiments, can include the entire upstream data frame as an embedded upstream data frame 432E. In some embodiments, network layer information 426U can direct upstream packet 436 to a V/AR service 406, which can use other packet information (e.g., port number or payload information) to forward packet data to a virtual wireless device 408. However, in other embodiments, a virtual wireless device 408 may have its own real world network address and/or port number.

A virtual wireless device 408 can generate a downstream packet 438 suitable for transmission over network path 416 to a corresponding emulating instance within V/AR access device 402. A downstream packet 438 can include various fields, including but not limited to, data link layer information 424D, network layer information 426D and a payload 428D. Data link layer information 424D can enable transmission of downstream packet 438 to a next point in a network path 416. Network layer information 426D can direct downstream packet 438 to a virtual device instance of V/AR access device 402. Payload 428D can include a data frame 444E encapsulated therein. Encapsulated data frame 444E can include corresponding embedded data link information 444-0 and payload 440-1.

Upon receiving downstream packet 438, a wireless device instance within V/AR access device 402 can decapsulate 442 the downstream packet to extract the encapsulated data frame 444E. The extracted data frame 444 can then be transmitted to a real world wireless device 404. Data link layer 444-0 of the extracted data frame 444 can identify the real world wireless device 404 as a destination.

In this way, a virtual wireless device instance run by a V/AR access device can encapsulate data frames from real word devices into packets for network transport to a virtual wireless device, and decapsulate packets from virtual wireless devices to access data frames for transmission to real word wireless devices.

Figure 5:
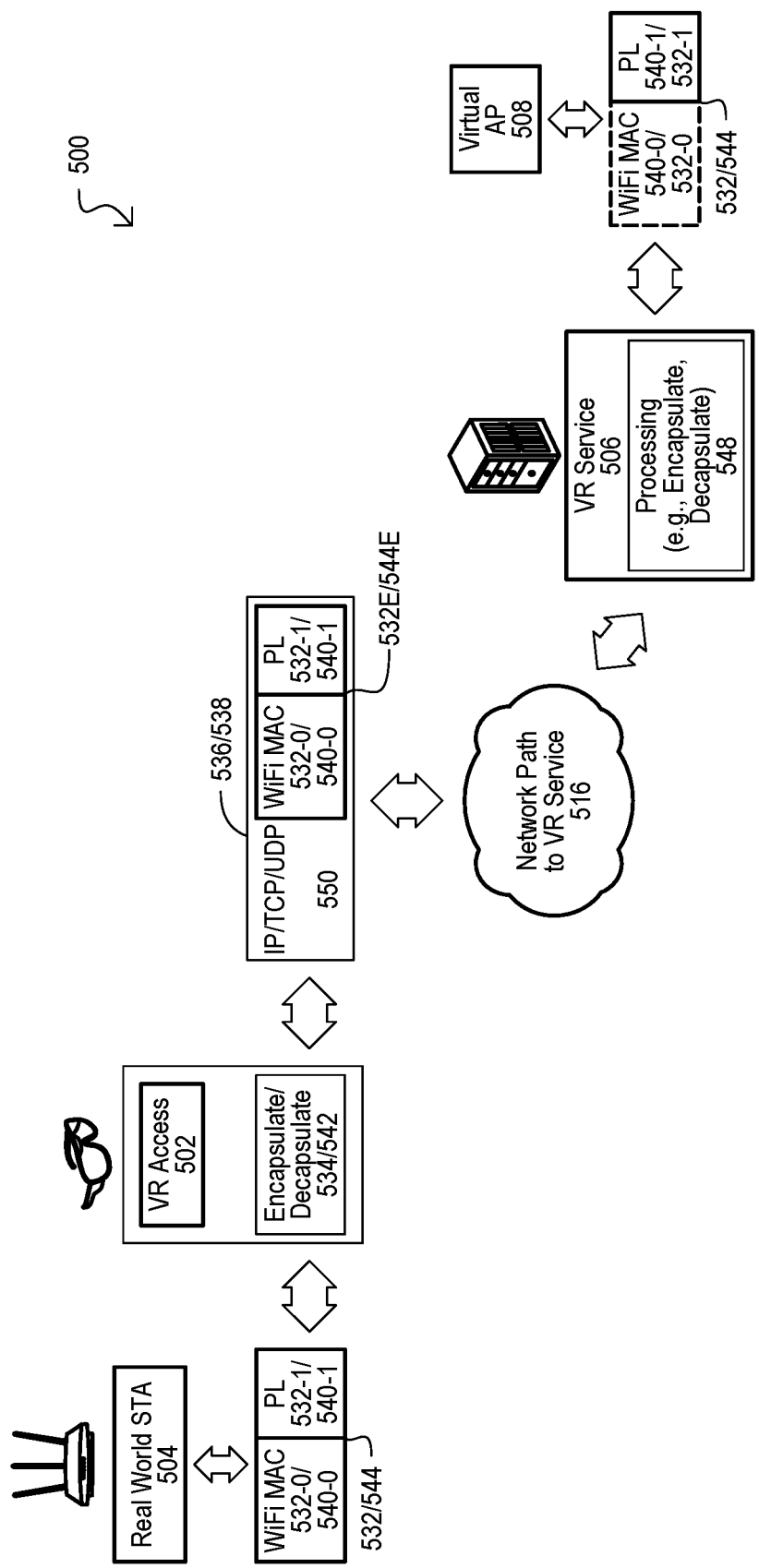
FIG. 5 is a diagram showing the relaying of communications between virtual and real world wireless devices that includes encapsulating Wi-Fi data frames into IP compatible packets according to embodiments.

FIG. 5 is a diagram of a system 500 according to another embodiment. A system 500 can relay communications between a real world STA and virtual AP. A system 500 can include a V/AR access device 502, real word STA 504, V/AR service 506 and virtual AP 508. Such items can take the form of embodiments described herein and equivalents. V/AR access device 502 can communicate with V/AR service 506 (and virtual AP 508) over a network 516, which can take the form of any of those described herein or equivalents.

In upstream communications (i.e., communications from a real world STA to a virtual AP), a real world STA 504 can transmit an upstream data frame 532, having a Wi-Fi MAC fields 532-0 and frame body (e.g., payload) 532-1. Wi-Fi MAC field 532-0 can include a MAC source address corresponding to real world STA 504, as well as a MAC destination address corresponding to virtual AP 508. Conversely, a real world STA 504 can receive a downstream data frame 544 with Wi-Fi MAC fields 540-0 and frame body 540-1. Downstream Wi-Fi MAC fields 540-0 can include a MAC source address corresponding to virtual AP 508 and a MAC destination address corresponding to real world STA 504.

V/AR access device 502 can execute an encapsulation process 534 that can encapsulate an upstream data frame 532 within an upstream IP packet 536 (shown as 523E). An upstream IP packet 536 can include IP header information along with transport layer data, such as TCP/UDP data 550. IP header information can include an IP source address corresponding to a virtual AP instance of the V/AR access device 502, and an IP destination address corresponding to the virtual AP 508. In some embodiments, TCP/UDP information can include a destination port value, which can correspond to virtual wireless operations, including virtual AP 508.

V/AR access device 502 can also execute a decapsulation process 542 that can decapsulate a downstream IP packet 538 to extract an encapsulated Wi-Fi data frame 544E. The encapsulated Wi-Fi data frame can be transmitted as a downstream Wi-Fi data frame 544 to real world STA 504. A downstream IP packet 538 can include an IP source address corresponding to a virtual AP 508, and an IP destination address corresponding to a virtual IP instance of the of the V/AR access device 502.

A system 500 can also include packet decapsulation and encapsulation 548, which can occur at V/AR service 506 and/or a virtual AP 508. Packet decapsulation and encapsulation 548 can include extracting an upstream Wi-Fi data frame 532 from an upstream IP packet and/or encapsulating a downstream W-Fi data frame 544 into a downstream IP packet 538. It is noted that while FIG. 5 shows decapsulation and encapsulation 548 as part of V/AR service 506, such actions can be executed all, or in part, by a virtual AP 508, depending upon how virtual AP 508 operates within a V/AR environment. In some embodiments, a virtual AP 508 can execute operations independently from other entities of a V/AR environment, in which case V/AR service 506 can forward an entire upstream IP packet 536 to a virtual AP 508, which can perform decapsulation operations. Conversely, virtual AP 508 can encapsulate a downstream W-Fi data frame 544 to generate a downstream IP packet 538, which can be forwarded to a V/AR access device 502 via V/AR service 506.

In this way, real world Wi-Fi devices can communicate with virtual APs via a relaying V/AR access device.

Figure 6:
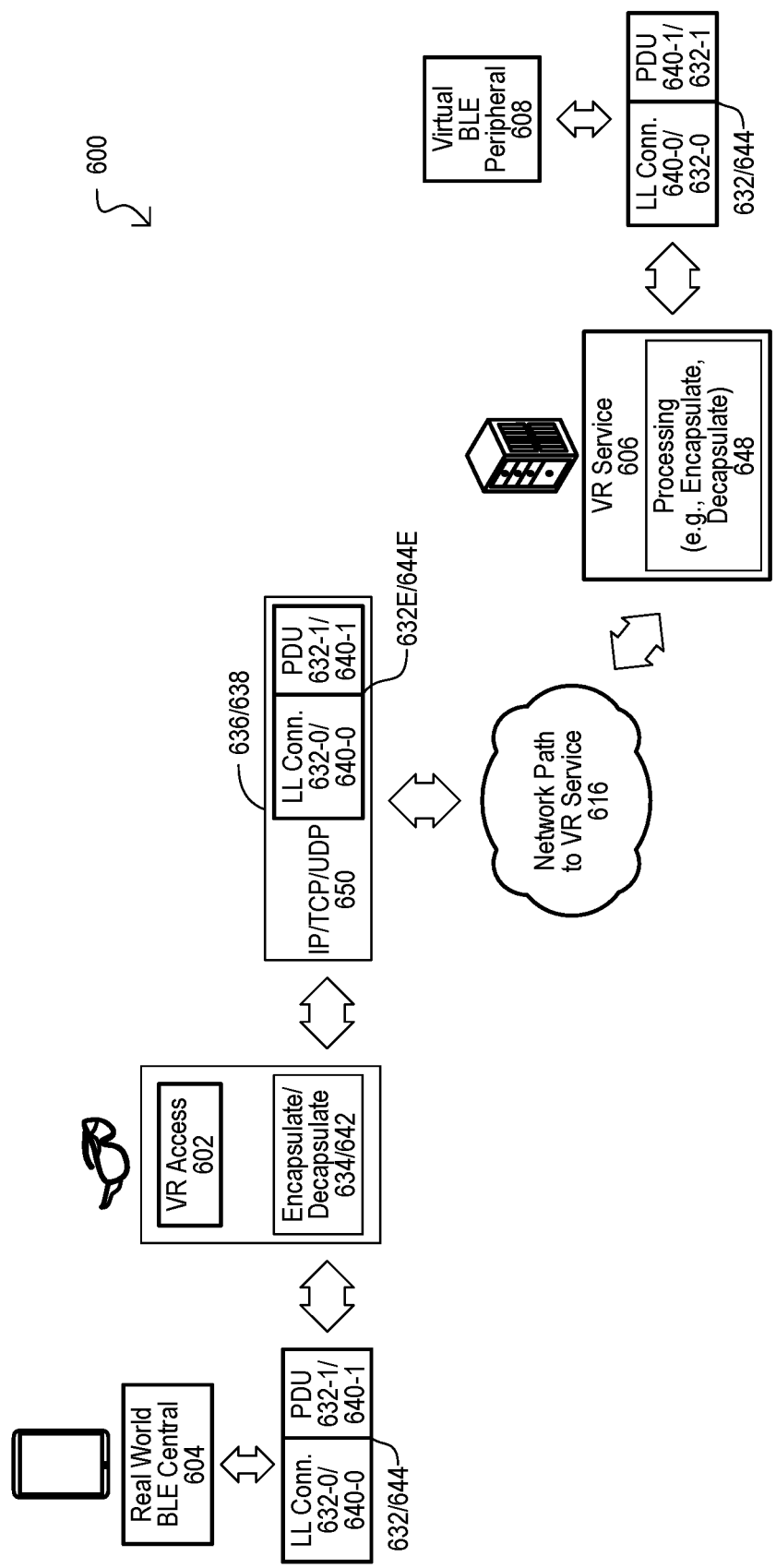
FIG. 6 is a diagram showing the relaying of communications between virtual and real world wireless devices that includes encapsulating Bluetooth compatible data frames into IP compatible packets according to embodiments.

FIG. 6 is a diagram of a system 600 according to another embodiment. A system 600 can relay communications between a real world central BLE device and virtual BLE peripheral device. A system 600 can include items like those of FIG. 5, and such like items are referred to with the same reference characters but with the leading digit being "6" instead of "5". A system 600 can operate in the same general fashion as that of FIG. 5, but with BLE data frames (i.e., BLE packets) instead of Wi-Fi data frames. Consequently, upstream and downstream data frames 632/644 can include BLE logical-link (LL) connection (e.g., address) information 632-0/640-0 and a PDU (i.e., payload) 632-1/640-1.

In this way, real world BLE central devices can communicate with virtual BLE peripheral devices via a relaying V/AR access device.

According to embodiments, a virtual wireless device can maintain a record of real-world devices with which it has communicated. Such information can include an address (e.g., MAC address, LL address). A record of real world devices can be created in any suitable manner, including but not limited to: adding information for a real world device as communication are first received from such a device and/or receiving such information in response to a query (e.g., query a default address).

Figure 7:
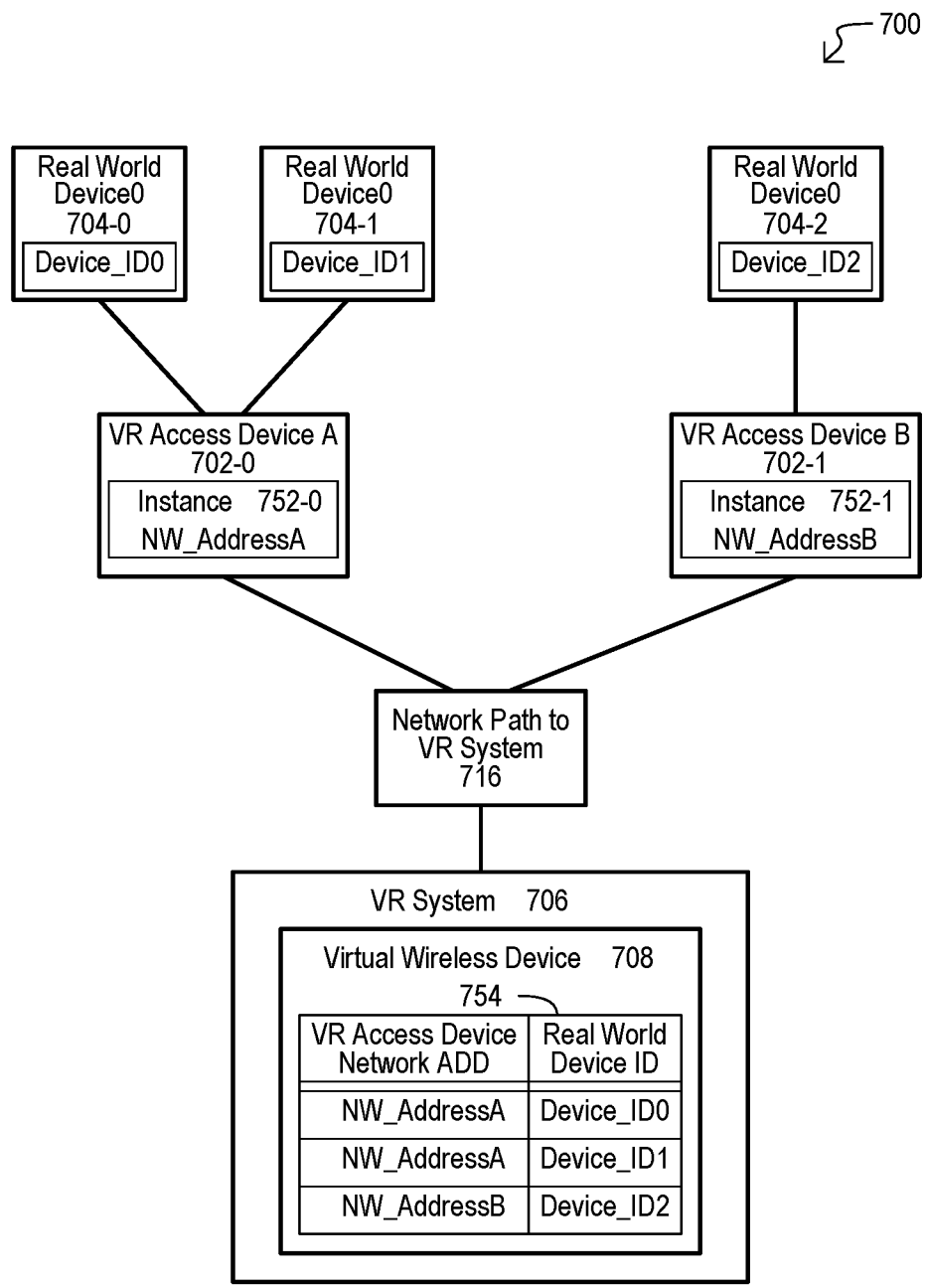
FIG. 7 is a block diagram of device identification and addressing in a system having both real world and virtual wireless devices according to an embodiment.

FIG. 7 shows a system 700 with a virtual wireless device with information on available real world wireless devices. A system 700 can include real world wireless devices 704-0 to 704-02, V/AR access devices 702-0/1, a network path 716 to a V/AR system 706, and a virtual wireless device 708. Such items can take the form of any of those described herein and equivalents.

In system 700, a V/AR access device 702-0 can serve to relay communications between real world wireless devices 704-0/1 and virtual wireless device 708. V/AR access device 702-1 can serve to relay communications between real world wireless device 704-2 and virtual wireless device 708. As a result, a virtual wireless device 708 can include a network map data structure 754 with information on the real world wireless devices (704-0 to -2). A network map data structure 754 can include any suitable information for enabling data frames to be relayed by a V/AR access device. In the embodiment shown, a network map data structure 754 can include, for each real world wireless device, a device identification value (Real Word Device ID), such as a MAC address or LL ID, and a network address for the V/AR access device, such as an IP address.

In this way, a virtual wireless device can maintain information on real world wireless devices with which it communicates.

According to embodiments, a virtual wireless device can assign virtual network addresses to real world devices and provide a list of accessible devices to real world devices. In some embodiments, real world devices can request network information (e.g., transmit packet to a default address). Such a request can be relayed to a virtual wireless device by a V/AR access device. In response to the request, a virtual wireless device can return information on network devices to the requesting real world device. In some embodiments, such network information can include, for each real world device, a network address of a relaying V/AR device, a device identifier (e.g., corresponding MAC address, LL ID) and an assigned virtual address. In some embodiments, such network information can include location information.

Figure 8:
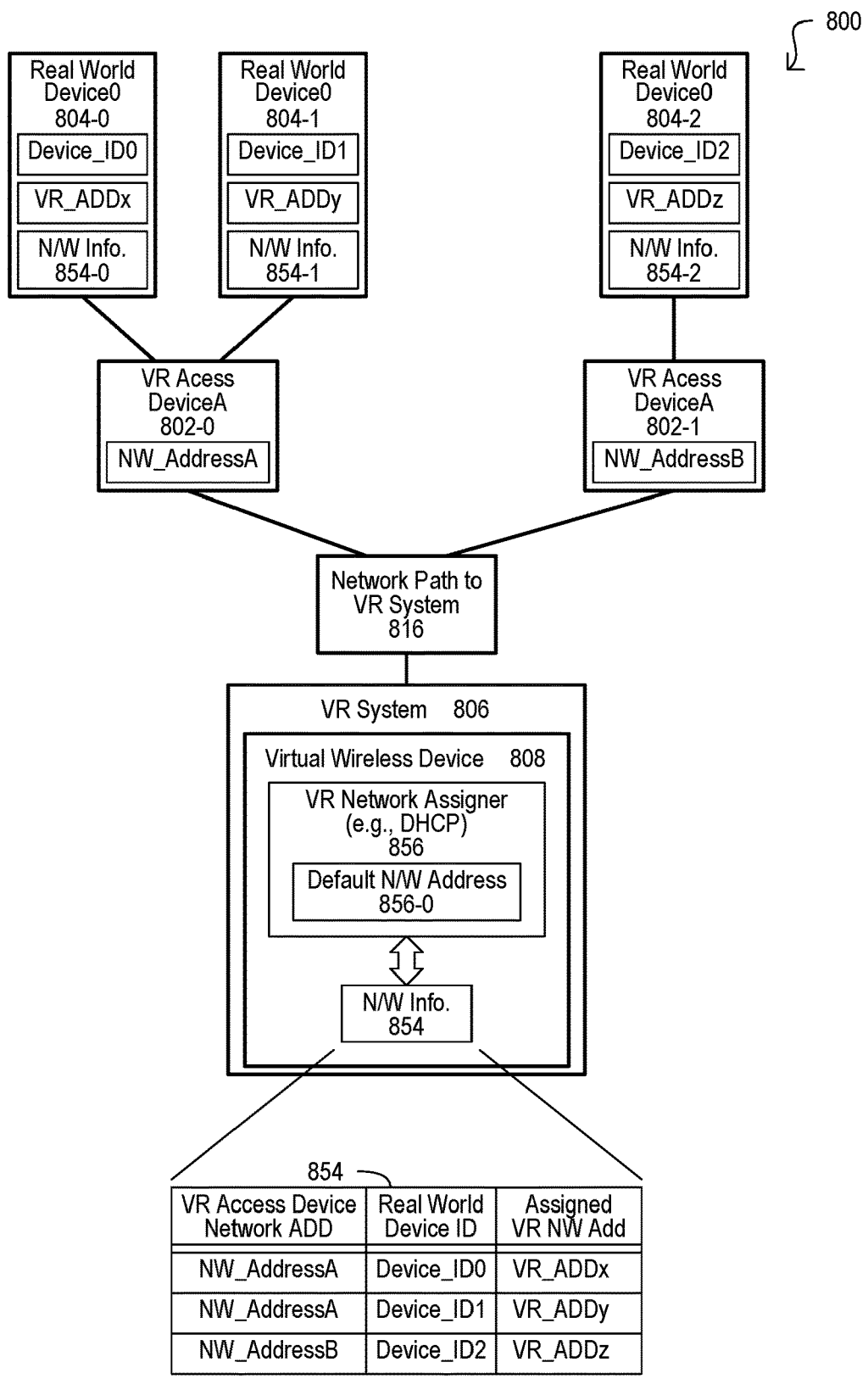
FIG. 8 is a block diagram of device identification and addressing in a system having both real world and virtual wireless devices according to another embodiment.

FIG. 8 shows a system 800 according to a further embodiment. A system 800 can include V/AR access devices 802-0/1, real world wireless devices 804-0 to 804-2, a network path 816, a V/AR system 806 and virtual wireless device 808. Such items can operate in the same fashion as those described herein, and equivalents.

Referring still to FIG. 8, a virtual wireless device 806 can execute a V/AR network assigning operation 856. Such an operation can include a virtual wireless device 806 receiving requests for network information from real world wireless devices (804-0 to -2), as relayed by V/AR access device 802-0/1. In some embodiments, requests for network information can be directed to a default address 856-0, which can be serviced by network assigning operation 856. In response to network information requests, virtual wireless device 806 can return an assigned virtual network address to a requesting real world device (804-0 to -2), as well as network information 854. Such an interaction can include authentication steps, as described herein, or equivalents, including a negotiation (e.g., request for a different assigned network address).

According to embodiments, network information 854 can include, for each real world wireless device, a network address for a corresponding V/AR access device, a device ID for the real world wireless device, and an assigned VR network address.

In some embodiments, real world wireless devices (804-0 to -2) can be Wi-Fi devices. A virtual wireless device 808 can support IP networking and function as a default router and DHCP server, providing assigned IP addresses to real world W-Fi devices. Such assigned IP addresses can be Internet address or addresses for an intranet of the V/AR environment.

In this way, a system can include a virtual wireless device that can assign virtual wireless network addresses to requesting real world devices.

Figure 9:
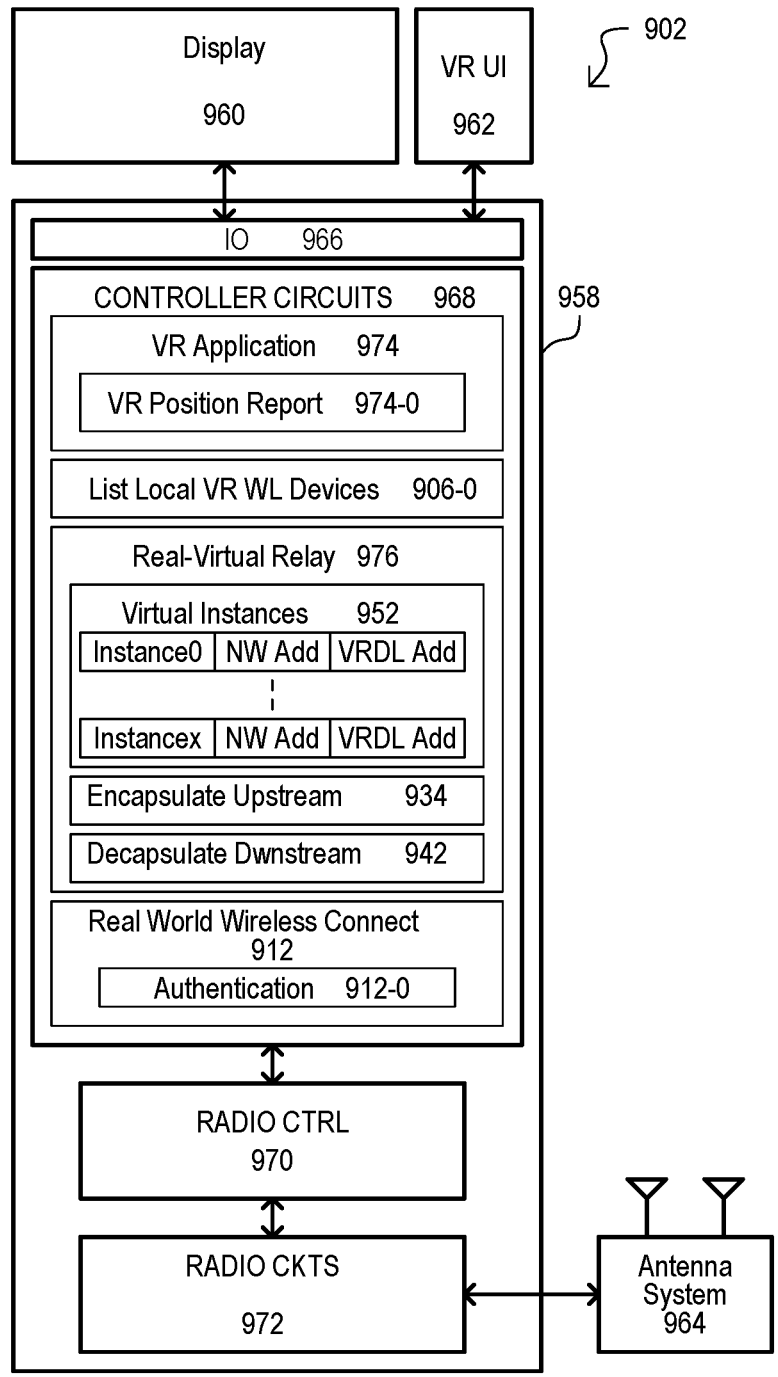
FIG. 9 is a block diagram of a virtual/augmented reality (V/AR) access device according to an embodiment.

FIG. 9 is a block diagram of a V/AR access device 902 according to an embodiment. A V/AR access device 902 can include a controller section 958, a display 960, a V/AR user interface (UI) 962 and an antenna system 964. A display 960 can provide a visual representation of a V/AR environment to a user, including 2D and/or 3D representations. A V/AR UI 962 can enable a user to interact with a V/AR environment, and in some embodiments, can be part of a display 960. However, in other embodiments it can be a device in communication with controller section 958 via wired and/or wireless communication path.

A controller section 958 can include input/output (IO) circuits 966, controller circuits 968, radio control circuits 970 and radio circuits 972. IO circuits 966 can enable controller section 968 to control display 960 and receive inputs from V/AR UI 962. In addition, IO circuits 966 can enable other devices to communicate with a V/AR access device 902. In some embodiments, a V/AR access device 902 can communicate with another system to access a V/AR system/service (e.g., a wired connection to a computing system). Controller circuits 968 can control operations of a V/AR access device 902, including relaying communications between real world and virtual wireless devices.

Controller circuits 968 can execute a V/AR application 974, store a list of V/AR wireless devices 906-0 received from a V/AR system, and perform real-virtual relay operations 976 and real world connection operations 912. A V/AR application 974 can execute suitable V/AR functions, including generating data for display 960 in response to inputs from V/AR UI 962 and data from a V/AR system. In addition, a V/AR application 974 can report a virtual location of a user to a V/AR system 974-0. A list of virtual wireless 906-0 can be stored in storage circuits and take the form of any of those described herein and equivalents, including virtual wireless devices within a virtual proximity operating according to one or more real world protocols.

Real-virtual relay operations 976 can include virtual instances of wireless devices 952, encapsulation operations 934 and decapsulation operations 942. A virtual instance 952 can be created for each virtual wireless device on a list 906-0 with which V/AR access device 902 has established a connection. In the embodiment shown, each such instance can include, but is not limited to a network address (NW Add) by which a virtual wireless device can communicate with a V/AR device 902, as well as a data-link address (VRDL Add) for the virtual wireless device which can be presented and/or provided to the real world wireless device. Encapsulation operations 934 can include any of those described herein, including but not limited to data-link layer data frames (e.g., Wi-Fi frames or BT frames) received from a real world device into an IP packet for transmission to a virtual wireless device. Decapsulation operations 942 can include any of those described herein, including but not limited to extracting data-link layer data frames from IP packets received from a virtual wireless device and transmitting the extracted data frame to a real world wireless device.

Real world connection operations 912 can include connecting an instance of the V/AR access device 902 to a real world device according to the corresponding protocol of the real world access device. According to embodiments, such operations can include an authentication operation 912-0.

Radio control circuits 970 can control operations of radio circuits 972. Radio control circuits and radio circuits 970/972 can operate according to one or more wireless protocols, including operating in one or more wireless bands. Radio circuit 972 can receive and transmit data via antenna system 964. In some embodiments, a V/AR access device 902 can communicate with a V/AR system/service via antenna system 964.

In this way, a V/AR access device can enable a user to access a V/AR environment, while at the same time serve as a relay between real world wireless devices and virtual wireless devices of the V/AR environment.

Controller circuits for V/AR access devices can take any suitable form, including those that operate according to one protocol. However, in some embodiments controller circuits of a V/AR access device can operate according to two or more different protocols (e.g., wireless communication standards).

Figure 10:
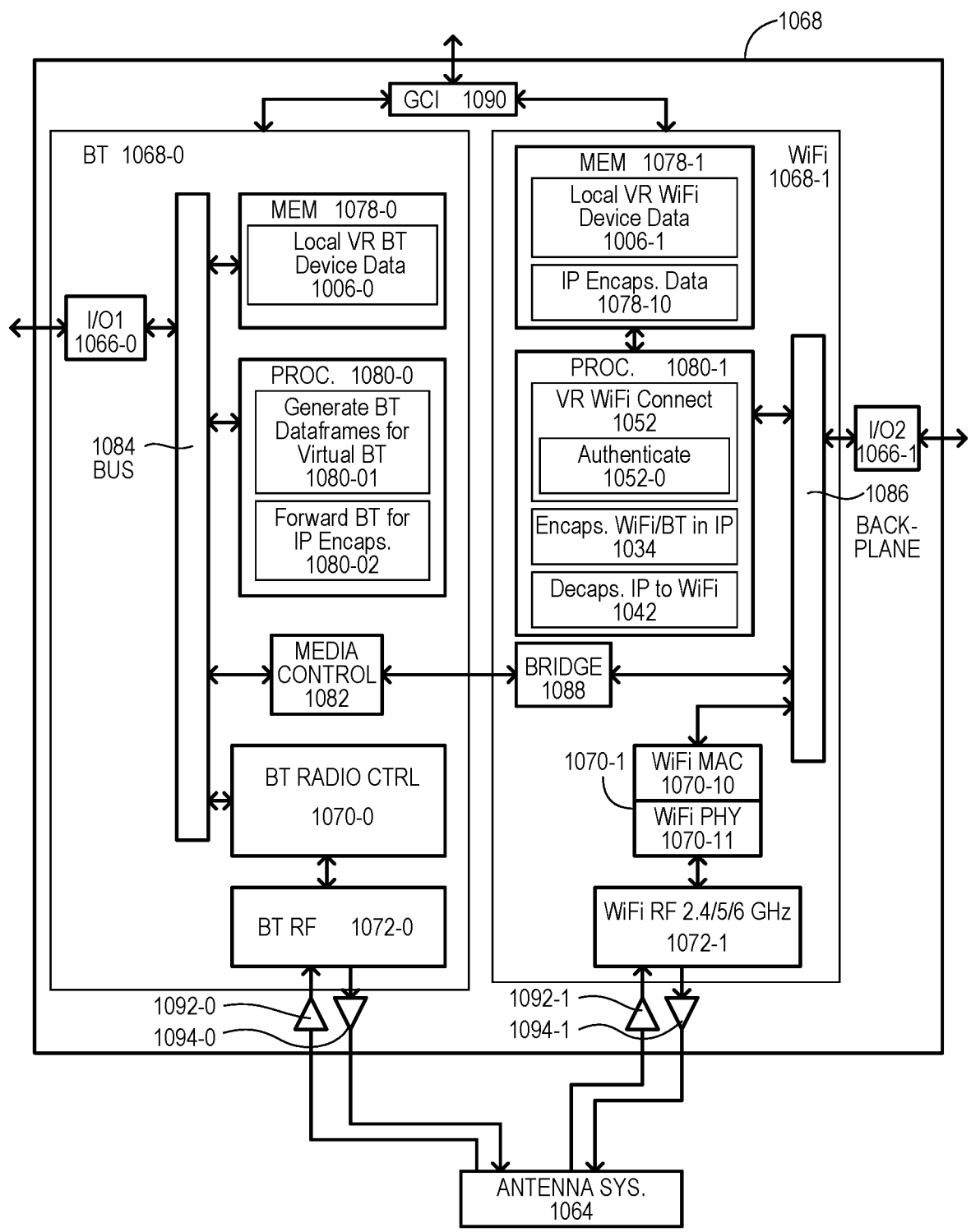
FIG. 10 is a block schematic diagram of an integrated circuit device for relaying communications between real world and virtual wireless devices according to an embodiment.

FIG. 10 is a block schematic diagram of controller circuits 1068 for a V/AR access device according to an embodiment. In some embodiments, controller circuits 1068 can be a single integrated circuit device, including part of a same integrated circuit substrate. Controller circuits 1068 can be compatible with two communication standards, BT (including BLE) and Wi-Fi, and enable relay operations between real world BT devices and virtual BT devices, and relay operations between real world Wi-Fi devices and virtual Wi-Fi devices.

Controller circuits 1068 can include a BT section 1068-0 and a Wi-Fi section 1068-1. BT section 1068-0 can include memory circuits 1078-0, processor circuits 1080-0, media control circuits 1082, BT radio control circuits 1070-0, BT RF circuits 1072-0 and I/O circuits 1066-0 in communication with one another over a bus 1084. Memory circuits 1078-0 can store data for BT operations, including data for local virtual BT devices 1006-0 (i.e., virtual BT devices within a virtual proximity). Processor circuits 1080-0 can execute instructions for BT operations, including a creating data frames for virtual BT devices 1080-01 and forwarding such BT data frames for encapsulation 1080-02. Creating BT data frames 1080-01 can include creating BT data frames using information on virtual BT devices 1006-0. Forwarding BT data frames 1080-02 can include forwarding such data frames to a Wi-Fi section 1068-1 for encapsulation into IP packets.

BT RF circuits 1072-0 can be controlled by BT radio circuits 1070-0 and can include radio circuits to enable transmission of packets according to one or more BT standards. In the embodiment shown, BT RF circuits 1070-0 can drive one or more BT power amplifiers (PA) 1094-0 and receive input signals from a BT low noise amplifier (LNA) 1092-0.

Media control circuits 1082 can communicate with Wi-Fi section 1068-1 over bridge circuits 1088 within Wi-Fi section 1068-1 to control access to a shared transmission medium (e.g., 2.4 GHz band). I/O circuits 1066-0 can provide a wired or wireless connection with communication circuits 1068 according to any of the embodiments described herein or equivalents.

A Wi-Fi section 1068-1 can include memory circuits 1078-1, processor circuits 1080-1, I/O circuits 1066-1, bridge circuits 1088, Wi-Fi radio control circuits 1070-1 and Wi-Fi RF circuits 1072-1. Memory section 1078-1 can store data for Wi-Fi operations, including data for local virtual Wi-Fi devices within a virtual proximity 1006-1, as well as IP encapsulating data 1078-10 for encapsulating BT and/or Wi-Fi data frames into IP packets for transmission to a virtual wireless device. Processor circuits 1080-1 can execute instructions for Wi-Fi operations. In some embodiments, such instructions can be stored in memory circuits 1078-1. Wi-Fi operations executed by a processor circuits 1080-1 can include, but are not limited to, virtual wireless connection operations 1052, encapsulation operations 1034 and decapsulation operations 1042. Virtual wireless device operations 1052 can include generating Wi-Fi data frames that follow a Wi-Fi standard for connecting with another Wi-Fi device, including authentication steps 1052-0 that can utilize a public key infrastructure. Such data frames can be encapsulated into IP packets that are transmitted to a virtual wireless device.

Encapsulation operations 1034 can encapsulate data frames into IP packets, including BT data frames received from BT section 1068-0 as well as Wi-Fi data frames generated by Wi-Fi section 1068-1. Decapsulation operations 1042 can decapsulate IP packets received from virtual wireless devices to extract encapsulated BT or Wi-Fi data frames. Extracted BT data frames can be processed by a BT section 1068-0. Extracted Wi-Fi frames can be processed by Wi-Fi section 1068-1.

I/O circuits 1066-1 can provide a wired or wireless connection with communication circuits 1068, including communications with a BT section 1068-0 over bridge circuits 1088. Bridge circuits 1088 can control communications between BT section 1068-0 and Wi-Fi section 1068-1.

Wi-Fi radio control circuits 1070-1 can include circuits for performing functions according to one or more IEEE 802.11 wireless standards, including those operating in the 2.4, 5 and 6 GHz bands. In some embodiments, this can include IEEE 802.11 compatible media access control (MAC) layer circuits 1070-10 and IEEE 802.11 compatible physical interface layer (PHY) circuits 1070-11. Wi-Fi RF circuits 1072-1 can include multi-band radio circuits that transmit and receive data on one or more Wi-Fi bands. In the embodiment shown, Wi-Fi RF circuits 1072-1 can drive one or more PAs 1094-1, and receive input signals from one or more LNAs 1092-1.

Controller circuits 1068 can also include a global coexistence interface (GCI) 1090 connected to both BT section 1068-0 and Wi-Fi section 1068-1. In some embodiments, GCI 1090 can enable controller circuits 1068 to interface with other wireless systems, such as cellular network systems, including but not limited to 3G, 4G, LTE and 5G networks.

Controller circuits 1068 can be connected to an antenna system 1064. Antenna system 1064 can include one or more physical antennas, as well as switches for enabling different connections to different antennas.

In this way controller circuits, which can include a single integrated circuit substrate, can include circuits for more than one wireless standard, can communicate with virtual wireless devices by encapsulating communications from such standards in IP packets.

Figure 11:
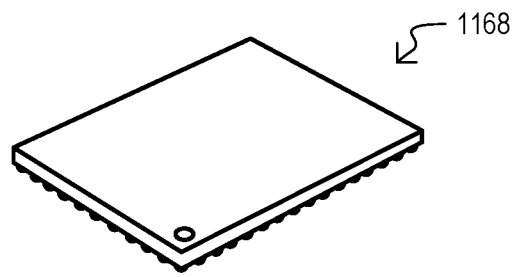
FIG. 11 is a diagram of an integrated circuit device according to an embodiment.

While embodiments can include controller circuits with various interconnected components, embodiments can also include unitary devices with controller circuits as described herein and equivalents. In some embodiments, such unitary devices can be advantageously compact single integrated circuits (i.e., chips). FIG. 11 shows a packaged single chip device 1168, which can include controller circuits as described herein, or equivalents, including circuits that relay communications between real word wireless devices and virtual wireless devices, including according to more than one standard.

In this way, a single integrated circuit device can provide real world to virtual wireless relay operations.

Figure 12A:
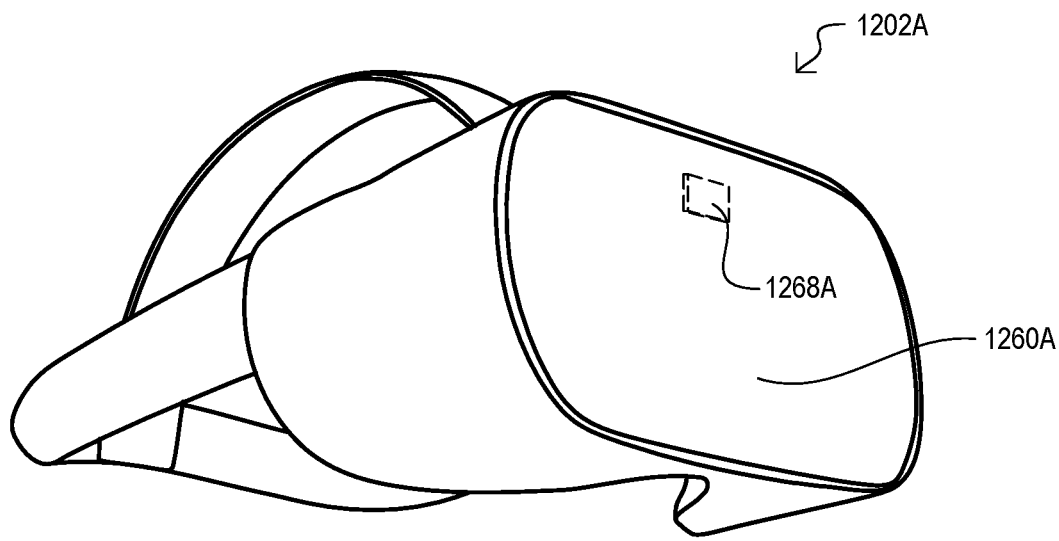
FIGS. 12A and 12B are diagrams of V/AR access devices according to embodiments.
Figure 12B:
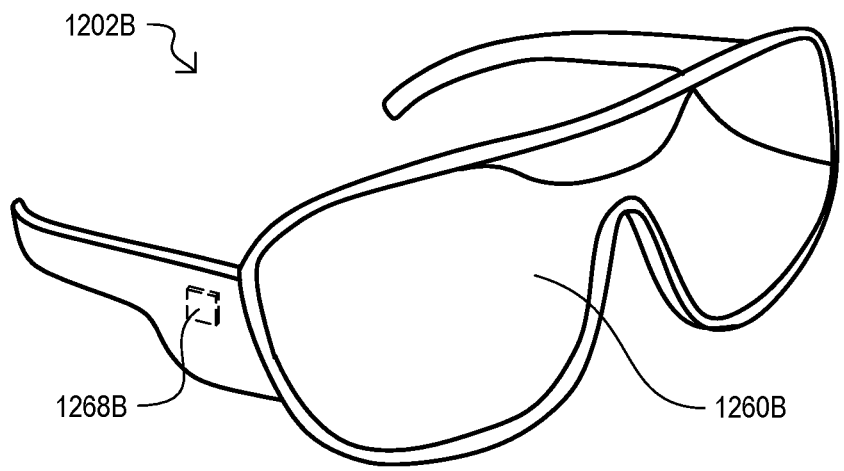

FIGS. 12A and 12B are diagrams of V/AR access devices according to embodiments. FIG. 12A shows a VR access device 1202A that can include a VR display 1260A and controller circuits 1268A. A VR display 1260A can present a VR environment to a user, which may or may not show a virtual location of virtual wireless devices. VR access device 1202A can include controller circuits 1268A according to any of the embodiments described herein, including single integrated circuit devices that can communicate according to more than one wireless standard.

FIG. 12B shows an AR access device 1202B according to an embodiment. AR access device 1202B can include an AR display 1260B through which a user can access an AR environment while viewing the real world. An AR access device 1202B can also include controller circuits 1268B, as described herein and equivalents.

Figure 13A:
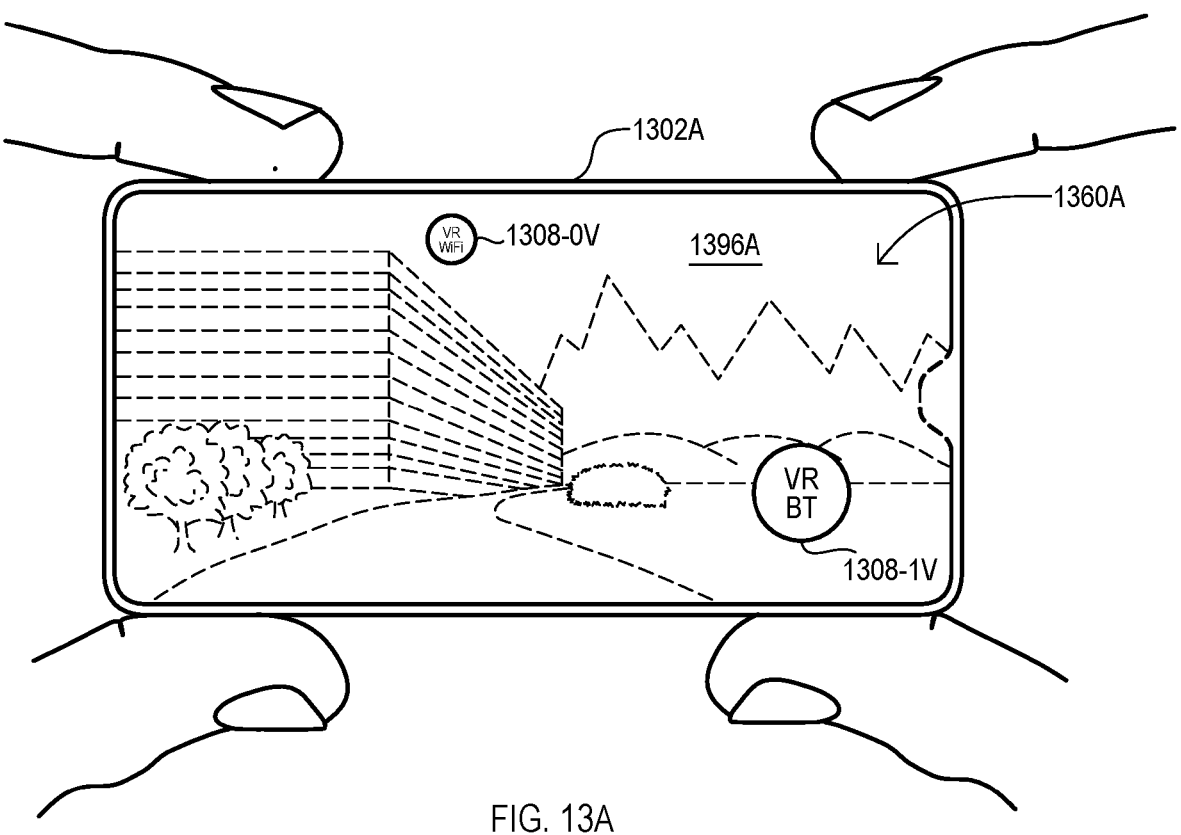
FIGS. 13A and 13B are diagrams showing V/AR access devices and presentations of a V/AR environment according to embodiments.
Figure 13B:
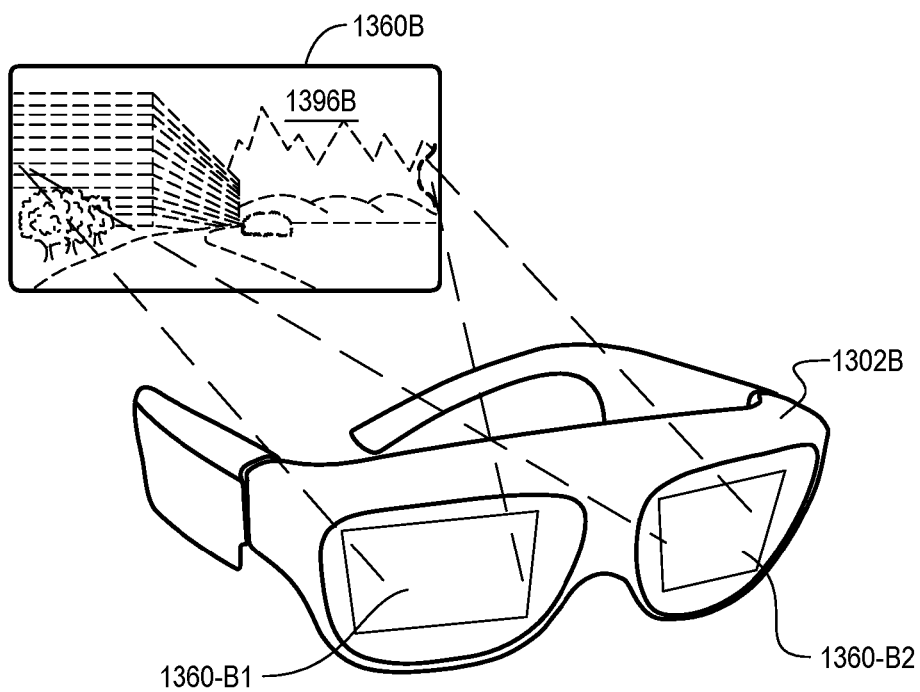

FIGS. 13A and 13B are diagrams of V/AR access devices according to additional embodiments. FIG. 13A shows a V/AR access device 1302A that can include a handheld computing device, such as a smartphone, tablet or portable gaming system. V/AR access device 1302A can include a V/AR display 1360A, which can present a V/AR environment 1396A. Virtual wireless devices, such as those in a virtual proximity, can be visible in a V/AR environment. FIG. 13A shows a virtual Wi-Fi device 1308-0V and a virtual BT device 1308-1V.

FIG. 13B shows a V/AR access device 1302B that can include a V/AR display formed of two parts, 1360-B1 and 1360-B2. In the embodiment of FIG. 13B, a V/AR environment 1396B may not display virtual wireless devices, with connections between virtual and real world wireless devices being established in the background of a V/AR application executed by a V/AR access device 1302B.

In this way, V/AR devices can take various forms, and can display or not display virtual wireless devices with which it can relay communication with real world wireless devices.

Figure 14:
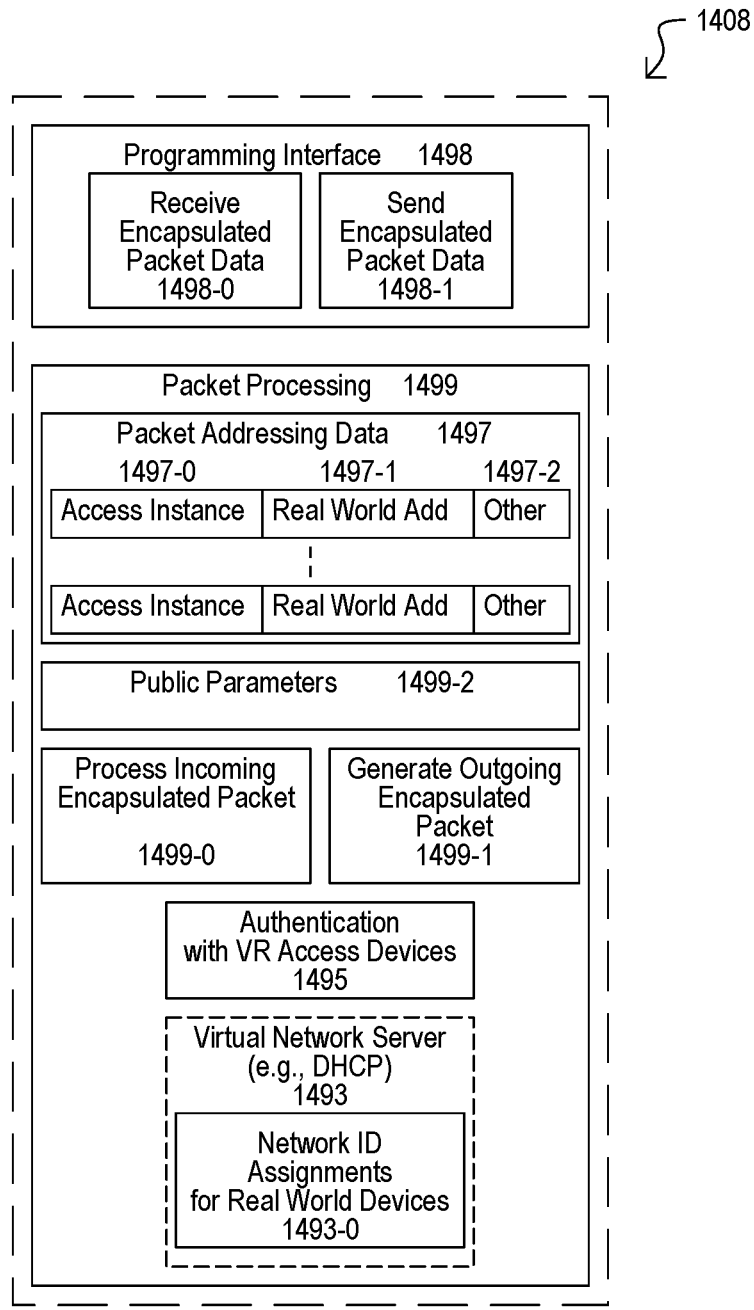
FIG. 14 is a block diagram of virtual wireless device according to an embodiment.

FIG. 14 is a block diagram of a virtual wireless device 1408 according to an embodiment. A virtual wireless device 1408 can take any suitable form, including entities created with code executed by one or more computing devices of a V/AR system. A virtual wireless device 1408 can include a programming interface 1498 and a packet processing section 1499. A programming interface 1498 can receive encapsulated packet data 1498-0 and send encapsulated packet data 1498-1. In some embodiments, receiving encapsulated packet data 1498-0 can include receiving a full packet. However, in other embodiments receiving encapsulated packet data 1498-0 can include receive a data frame extracted from a packet.

Packet processing section 1499 can include packet addressing data 1497, public parameters 1499-2, processing incoming encapsulated packets 1499-0, generating outgoing encapsulated packets 1499-1, and an authentication process 1495. Optionally, a virtual wireless device 1408 can include a network server operation 1493. Packet addressing data 1497 can include data for generating outgoing packets. Packet addressing data 1497 can include access instance data 1497-0, real world device data 1497-1 and other data 1497-2. Access instance data 1497-0 can identify a V/AR access devices that are relaying data for the virtual wireless device 1408. In some embodiments, this can include IP addresses. Real world device data 1497-1 can identify a real world device to which data can be relayed. In some embodiments, this can include a MAC address for a real world device. Other data 1497-2 can include data suitable for enabling a relayed connection to a real world device, including but not limited to a protocol type and authentication information. Public parameters 1499-2 can include information that could be public according to a real world wireless standard, including but not limited to SSID and AKM data for a virtual Wi-Fi device and an advertising message for a virtual BLE device.

Processing incoming encapsulated packets 1499-0 can include extracting a data frame from a received network packet. Such an operation can include identifying a source of the packet (e.g., a sending V/AR access device), and from such data determining data fields containing a data frame and/or desired data field within a data frame (e.g., BT PDU or Wi-Fi frame body). Generating outgoing encapsulated packets 1499-1 can include constructing a data frame according to a network link layer protocol and embedding the data frame into a network packet according to a network layer protocol.

Authentication process 1495 can execute authentication procedures with V/AR access devices according to embodiments described herein or equivalents.

In some embodiments, a virtual wireless device 1408 can include network server functions 1493. Network server functions 1493-0 can include assigning network ID values to real world devices 1493-0. In some embodiments, this can include functioning as a DHCP server.

In this way, a virtual wireless device can maintain information for associating a V/AR access device (e.g., an instance) with a real world wireless device, and receive and transmit network packets with encapsulated data frames compatible with such real world devices.

Figure 15:
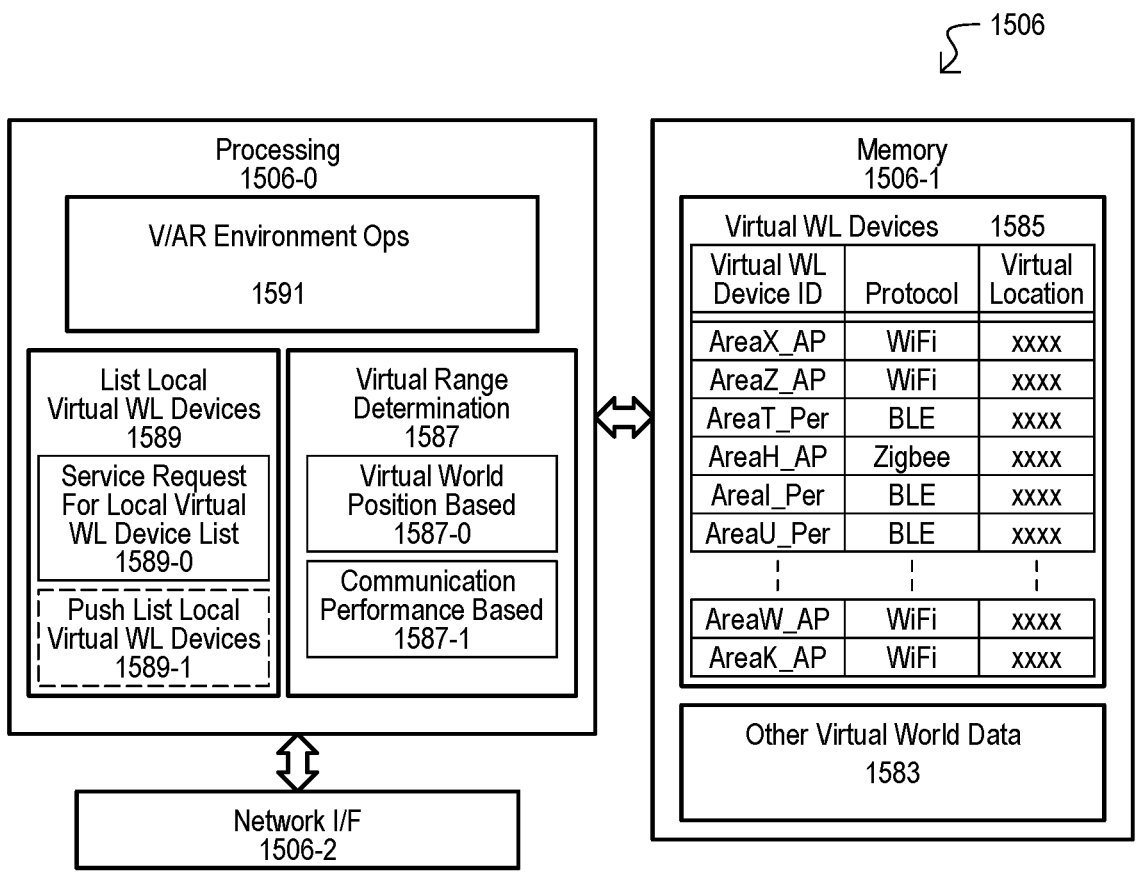
FIG. 15 is a block diagram of a V/AR system according to an embodiment.

FIG. 15 is a block diagram of a V/AR system 1506 according to an embodiment. A V/AR system 1506 can include a processing section 1506-0, a memory section 1506-1 and a network interface (IF) 1506-2. In some embodiments, a V/AR system 1506 can include one or more server systems. A processing section 1506-0 can include V/AR environment operations 1591, list providing operations 1589 and virtual range operations 1587. V/AR environment operations 1591 can maintain a state of a V/AR environment, including determining positions of users, virtual wireless devices and/or updating a V/AR environment in response to user inputs.

Virtual range operations 1587 can receive a virtual position of users, such as that reported by corresponding V/AR access device and determine whether any virtual wireless devices are within a virtual range of a user's virtual location. In some embodiments, a virtual range can be determined based on virtual position 1587-0 (e.g., virtual position of user in V/AR environment relative to virtual position of virtual wireless device(s)). In addition or alternatively, a virtual range can be determined based on communications between a virtual wireless device and a real world wireless device 1587-1 (as relayed by a V/AR access device). List providing operations 1589 can provide a list of virtual wireless devices within a virtual range of a user to a V/AR access device. In some embodiments, a list of local virtual wireless devices can be provided in response to a request from a user device 1589-0. In addition or alternatively, a V/AR system 1506 can push such a list out to V/AR access devices 1589-1. Further, a notification can be transmitted to a V/AR access device when a virtual wireless device is determined to be out of virtual range with respect to the user of the V/AR access device.

A network IF 1506-2 can enable communications between a V/AR system 1506 and V/AR access devices, and optionally, virtual wireless devices. In some embodiments, a network IF 1506-2 can be connected to the Internet, and a V/AR system 1506 can communicate with V/AR access devices with IP packets.

A memory section 1506-1 can include virtual wireless device data 1585 as well as other V/AR environment data 1583. Virtual wireless device data 1585 can include a virtual location for virtual wireless devices as well as any other suitable information, which can include, but is not limited to a protocol type and/or identifying information for the virtual wireless device. Other V/AR environment data 1583 can include other suitable data for maintaining a V/AR environment.

In this way, V/AR system can determine a virtual proximity between users and virtual wireless device in a V/AR environment and report a list of such virtual devices to a V/AR access device.

While embodiments can include any of the methods described herein in conjunction with various operations, devices and systems, additional methods will now be described with reference to flow diagrams. It is understood that all, or portions of the described methods can be combined with one another. Further, operations in such methods can occur in a different order and/or in parallel with respect to one another.

Figure 16A:
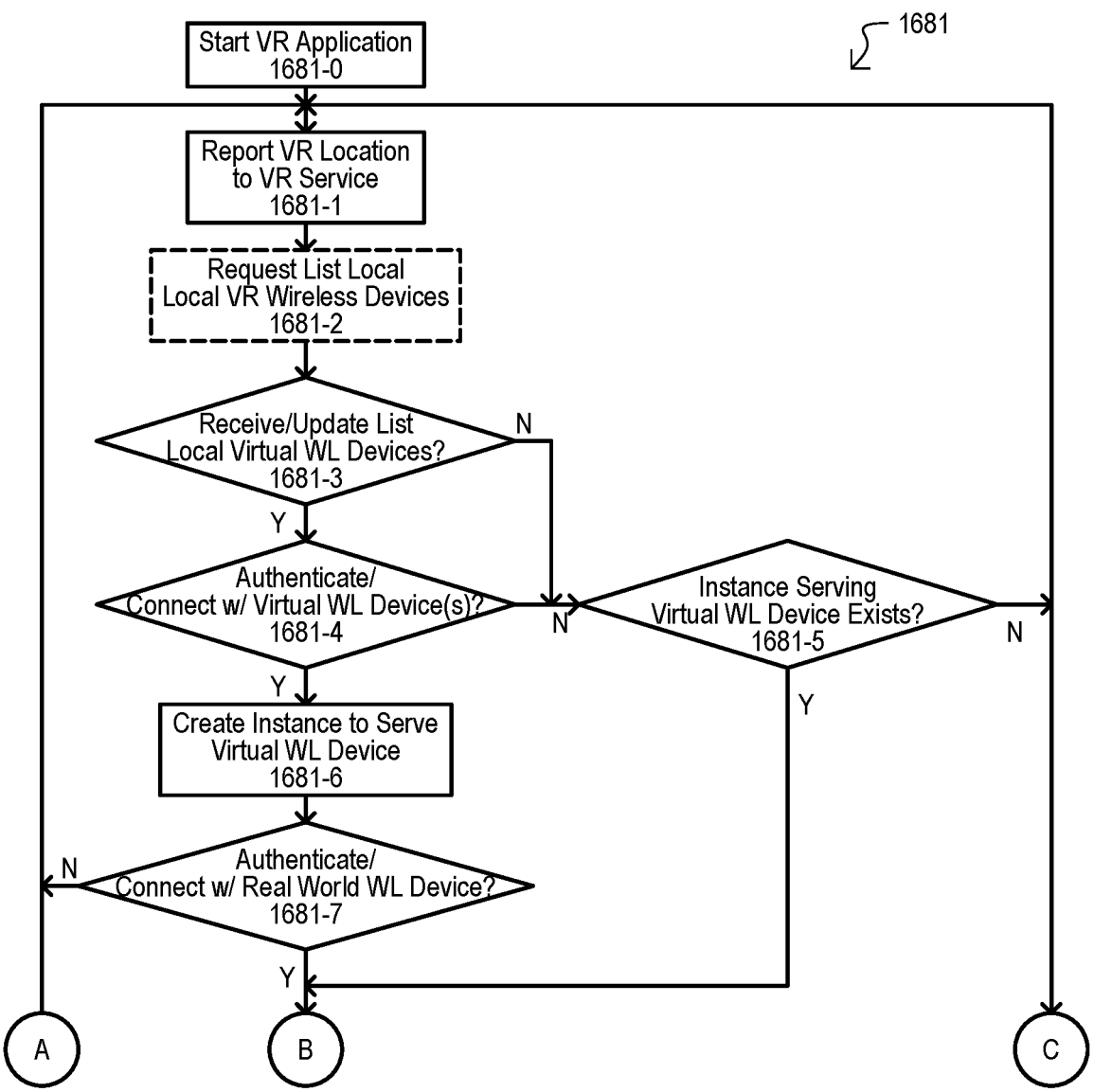
FIGS. 16A and 16B show a flow diagram of a method that can be executed by a V/AR access device according to an embodiment.
Figure 16B:
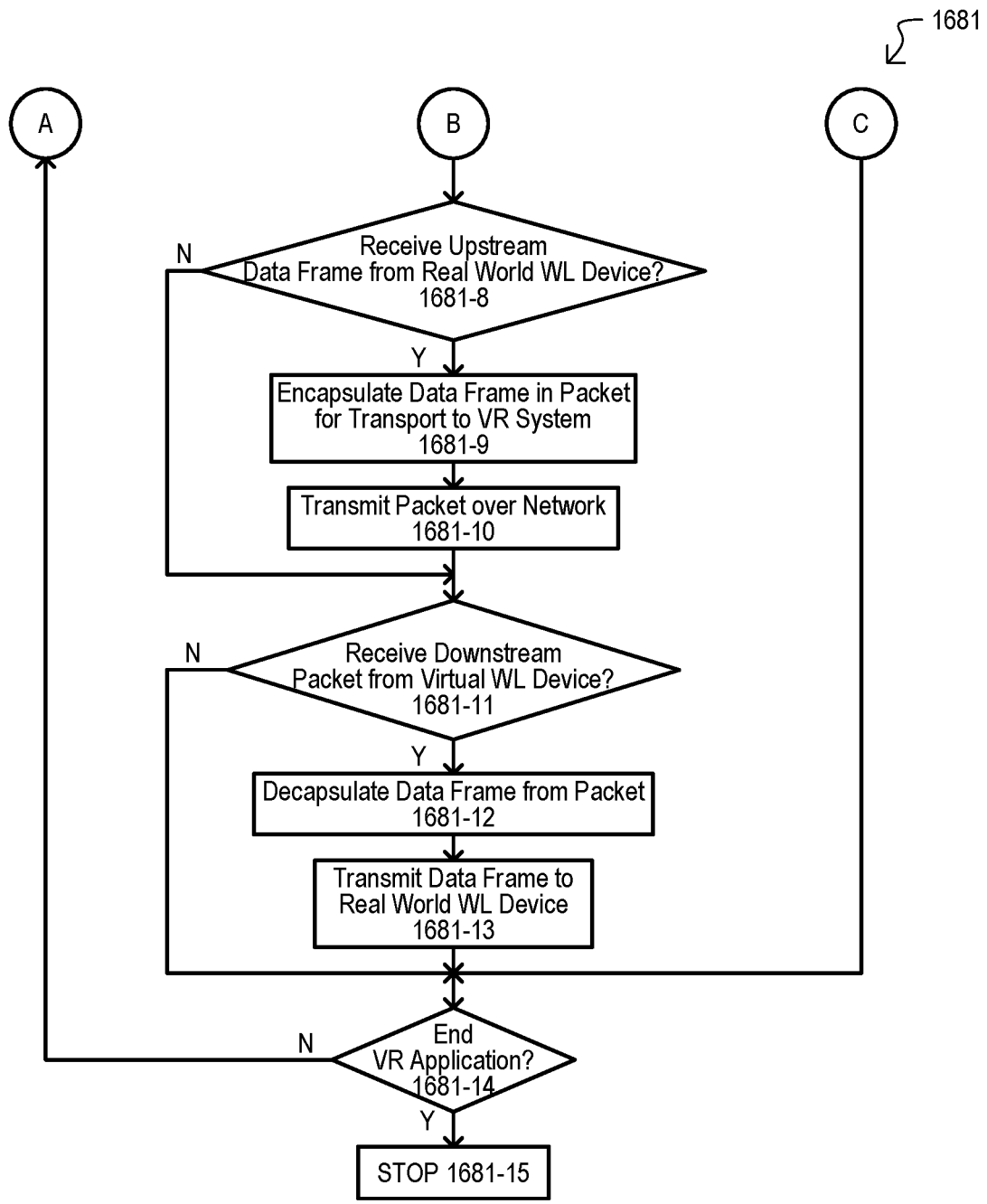

FIGS. 16A and 16B are flow diagrams of a method 1681 according to an embodiment. Connected paths between FIGS. 16A and 16B are shown by circles with the letters A, B and C. A method 1681 can be executed by a V/AR access device as described herein or equivalents. A method 1681 can include starting a V/AR application 1681-0. Such an action can include executing an application on a V/AR access device that can communicate with a V/AR service. A method 1681 can report a virtual location to a VR service 1681-1. In some embodiments, a list of local virtual wireless devices can be requested 1681-2.

A method 1681 can include determining if a list of local virtual wireless devices was received and/or updated 1681-3. Such an action can include receiving a notification that one or more virtual wireless devices are out of virtual range. If a list has not been received/updated (N from 1681-3), a method 1681 can determine if an instance serving a virtual wireless device exists 1681-5. If there are no instances (N from 1681-5), the V/AR application can determine whether or not to end the V/AR application 1681-14, as shown in FIG. 16B.

If a list has been received/updated (Y from 1681-3), a method 1681 can attempt to authenticate and connect with virtual wireless devices on the list 1681-4. If connections are not made to any virtual wireless devices (N from 1681-4), a method 1681 can determine if any relaying instances exist (go to 1681-5). If a connection is made to a virtual wireless device (Y from 1681-4), an instance can be created to serve the virtual wireless device 1681-6. Such an action can include initiating a process that can relay communications between a virtual wireless device and a real world wireless device as described herein or equivalents. If a method 1681 creates one or more instances, an attempt can be made to connect with a real world wireless device 1681-7. If no such connection can be made (N from 1681-7), a method 1681 can return to reporting a virtual location 1681-1.

If it can be determined that an instance serving a virtual wireless device exists and a connection has been made to a real world wireless device, a method 1681 can execute relaying functions. Referring to FIG. 16B, relaying functions can include determining if an upstream data frame has been received from a real world device 1681-8. If an upstream data frame has been received (Y from 1681-8), the received data frame can be encapsulated in a packet for transport to a V/AR system 1681-9. Such a packet can be transmitted over a network 1681-10.

If no upstream data frame is received and no upstream packet has been transmitted, a method 1681 can determine if a downstream packet has been received 1681-11. If a downstream packet has been received (Y from 1681-11), a method 1681 can decapsulate the packet to access a data frame therein 1681-12. The data frame can then be transmitted to the real world wireless device 1681-13.

If no downstream packet is received or no data frame has been transmitted, a method 1681 can determine whether an application is to be ended 1681-14. If an application is not to be ended (N from 1681-14), a method 1681 return to reporting a virtual location 1681-1. If an application is to be ended (Y from 1681-14), a method 1681 can end 1681-15.

In this way, a method can report a virtual location, connect to both a virtual wireless device and a real world wireless device, and transfer data between the two.

Figure 17:
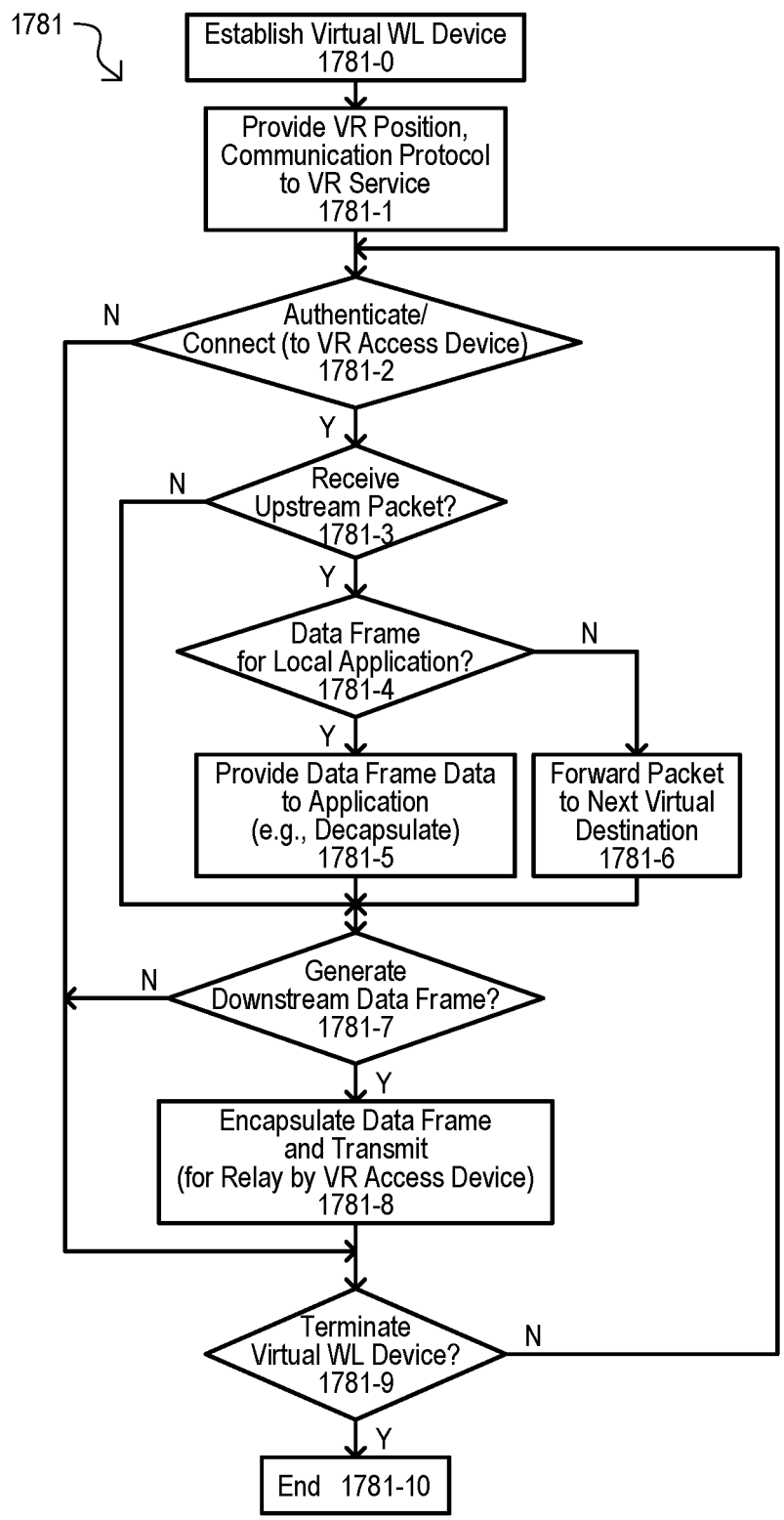
FIG. 17 is a flow diagram of a method that can be executed by a virtual wireless device according to an embodiment.

FIG. 17 is a flow diagram of a method 1781 according to an embodiment. A method 1781 can be executed by a virtual wireless device as described herein or equivalents. A method 1781 can include establishing a virtual wireless device 1781-0. Such an action can include creating or enabling an instance of a virtual reality device having functions as described herein or equivalents. A virtual wireless device may be a pre-established feature (e.g., entity) of a V/AR environment and/or created by another entity (e.g., another process or user). A virtual position and communication protocol for a virtual wireless device can be reported to a VR service 1781-1.

A method 1781 can then determine if authentication and connection takes place with a V/AR access device 1781-2. Such an action can include receiving communications from a V/AR access device requesting authentication and connection. If a connection is made with a V/AR access device (Y from 1781-2), a method 1781 can use such a connection to communicate with a real world wireless device via the V/AR access device. Such communications can include determining if an upstream packet has been received 1781-3.

If an upstream packet has been received (Y from 1781-3), a determination can be made as to whether the packet includes a data frame for a local application (e.g., an application executed by, or related to the virtual wireless device). If a data frame within the packet is not for a local application (N from 1781-4), the packet can be forwarded to a next virtual destination 1781-6. Such an action can include forwarding the data frame in any suitable manner, including the data frame being forwarded in a packet form or via a communication path internal to a V/AR system. If a data frame within the packet is for a local application (Y from 1781-4), the data frame can be extracted from the packet and provided to the application 1781-5.

A method 1781 can also include determining if a downstream data frame is to be generated 1781-7. If a downstream packet is to be generated (Y from 1781-7), a data frame can be encapsulated and transmitted 1781-8. Such an action can include transmitting an encapsulating packet to a V/AR access device for relay to a real world wireless device. If no connections are made to a V/AR access device (N from 1781-2), and no downstream packet is transmitted (N from 1781-7), a method 1781 can determine if the virtual wireless device should be terminated 1781-9. If a virtual wireless device is not to be terminated (N from 1781-9), a method 1781 can return to waiting to connect to a V/AR access device. If a virtual wireless device is to be terminated (Y from 1781-9), a method 1781 can end 1781-10.

In this way, a method can establish a virtual wireless device that can authenticate and connect with a V/AR access device. The virtual wireless device can receive upstream packets relayed by the V/AR access device and transmit downstream packets to the V/AR access device.

Figure 18:
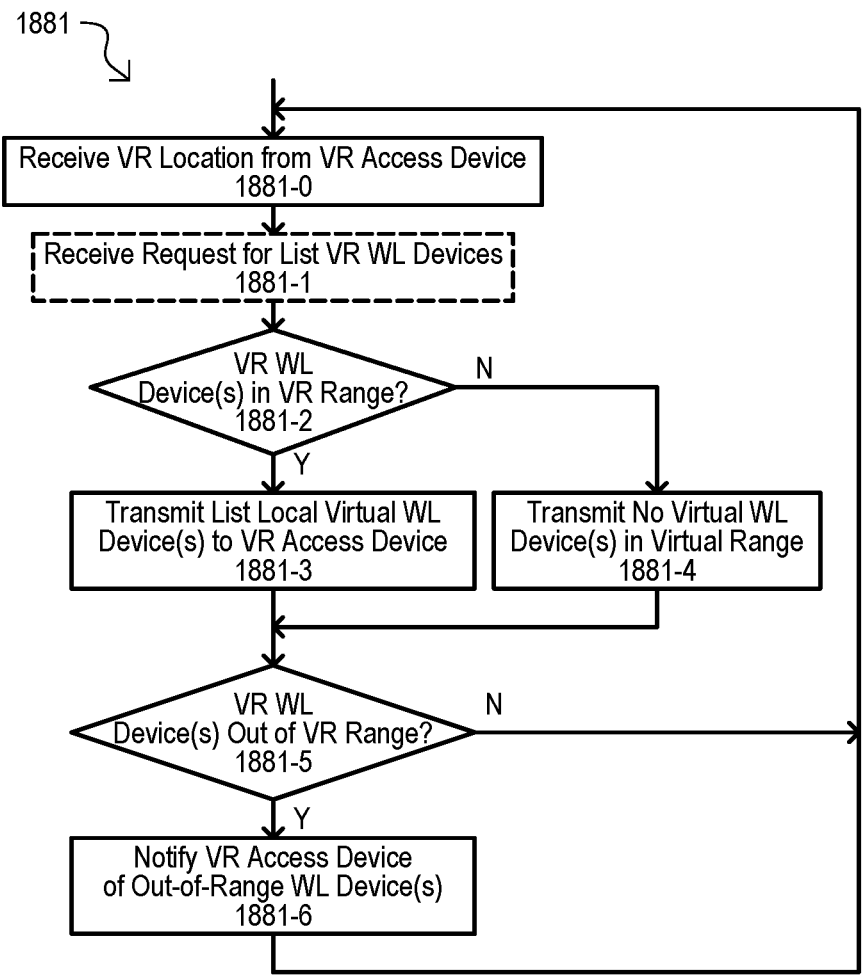
FIG. 18 is a flow diagram of a method that can be executed by a V/AR system according to an embodiment.

FIG. 18 is a flow diagram of a method 1881 according to another embodiment. A method 1881 can be executed by a V/AR system or service as described herein or equivalents. A method 1881 can include receiving a V/AR location from a V/AR access device 1881-0. Such an action can include receiving packets from a V/AR access device. Optionally, a method 1881 can include receiving a request for a list of V/AR wireless devices 1881-1. A method 1881 can include determining which virtual wireless devices are within a virtual range of a reported virtual location 1881-2. Such an action can include any of those described herein, including basing virtual range on relative virtual positions in a V/AR environment, basing virtual range on communication performance, or combinations thereof. If there are virtual wireless devices in range of a virtual location reported, a method 1881 can transmit a list of such in range virtual devices to a reporting (or requesting) device 1881-3. Such a list can take the form of any of those described herein or equivalents. If there are no virtual wireless devices in range of a virtual location reported, a method 1881 can report such a result to a reporting (or requesting) device 1881-4. A method 1881 can also include determining if any virtual wireless devices are out of virtual range 1881-5. If a virtual wireless device is out of virtual range (Y from 1881-5), a method 1881 can report so to the corresponding V/AR access device 1881-6. If no virtual wireless devices are out of range (N from 1881-5), a method 1881 can then return to receiving virtual location reports from V/AR access devices (return to 1881-0).

In this way, a method can receive virtual locations from V/AR access devices, determine if any virtual wireless devices are within a virtual proximity of such a virtual location, and transmit a list of such in range virtual wireless devices to the V/AR access device.

Figure 19A:
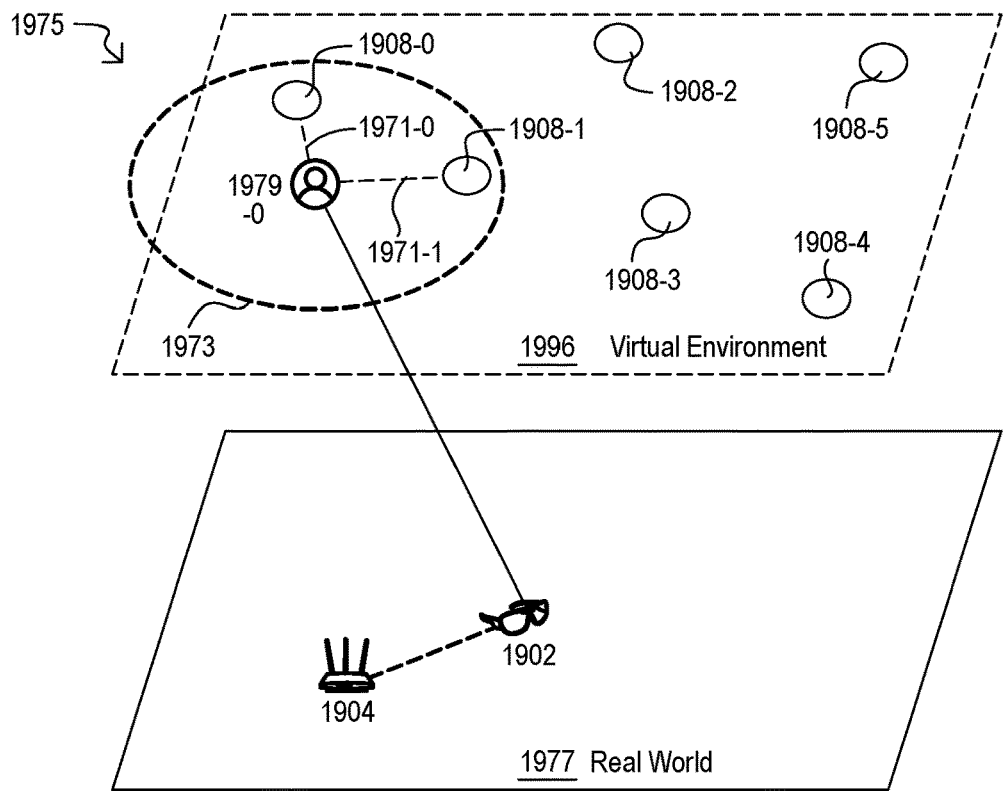
FIGS. 19A to 19D are diagrams showing operations according to embodiments.
Figure 19B:
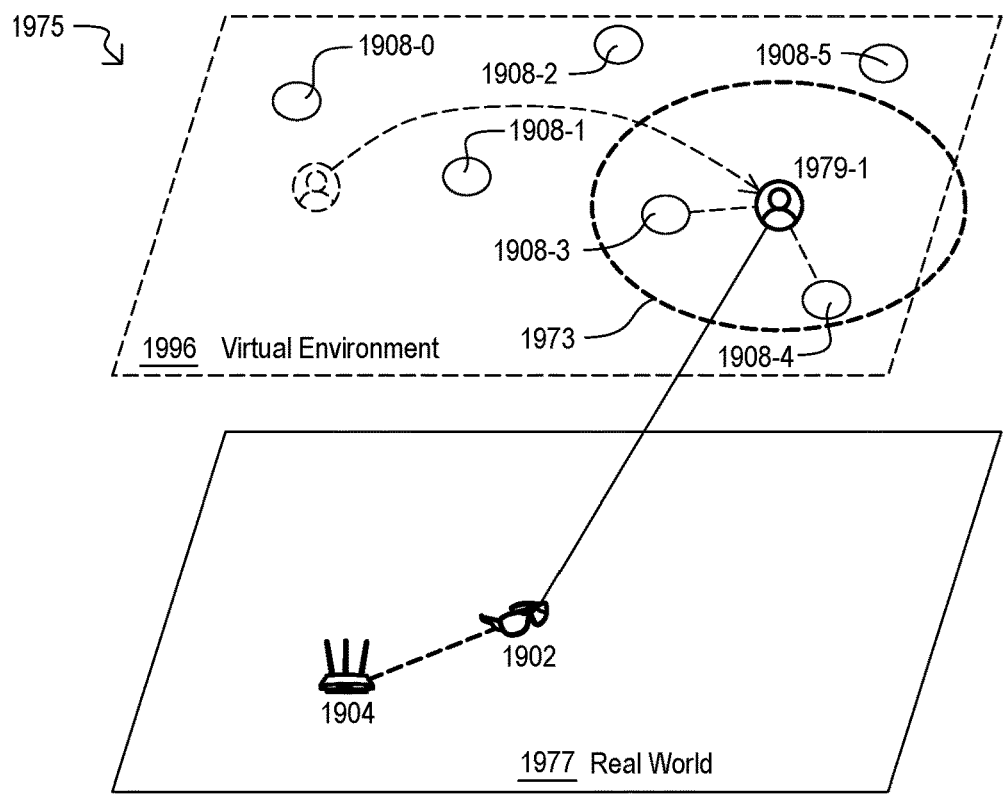

FIGS. 19A to 19D are diagrams showing virtual world and corresponding real world operations 1975 according to embodiments. FIGS. 19A and 19B show how connections to virtual wireless devices can change as a user's virtual location changes. FIG. 19A shows a V/AR environment 1996 that includes a number of virtual wireless devices 1908-0 to -5, as well as the real world, which includes a V/AR access device 1902 and real world wireless device 1904.

In FIG. 19A, virtual wireless devices 1908-0 and 1908-1 can be within a virtual proximity 1973 of a user virtual location 1979-0. V/AR access device 1902 can relay communications between real world wireless device 1904 and virtual wireless device 1908-0 over a connection 1971-0. V/AR access device 1902 can relay communications between real world wireless device 1904 and virtual wireless device 1908-1 over a connection 1971-1.

FIG. 19B shows operations after a user has moved to another virtual location 1979-1. At virtual location 1979-1, virtual wireless devices 1908-0/1 are out of a virtual proximity 1973, while virtual wireless devices 1908-3 and 1908-4 are within a virtual proximity 1973. A V/AR access device 1902 can establish connections with virtual wireless devices 1908-3/4, and relay communications between such virtual wireless devices 1908-3/4 and real world wireless device 1904.

Figure 19C:
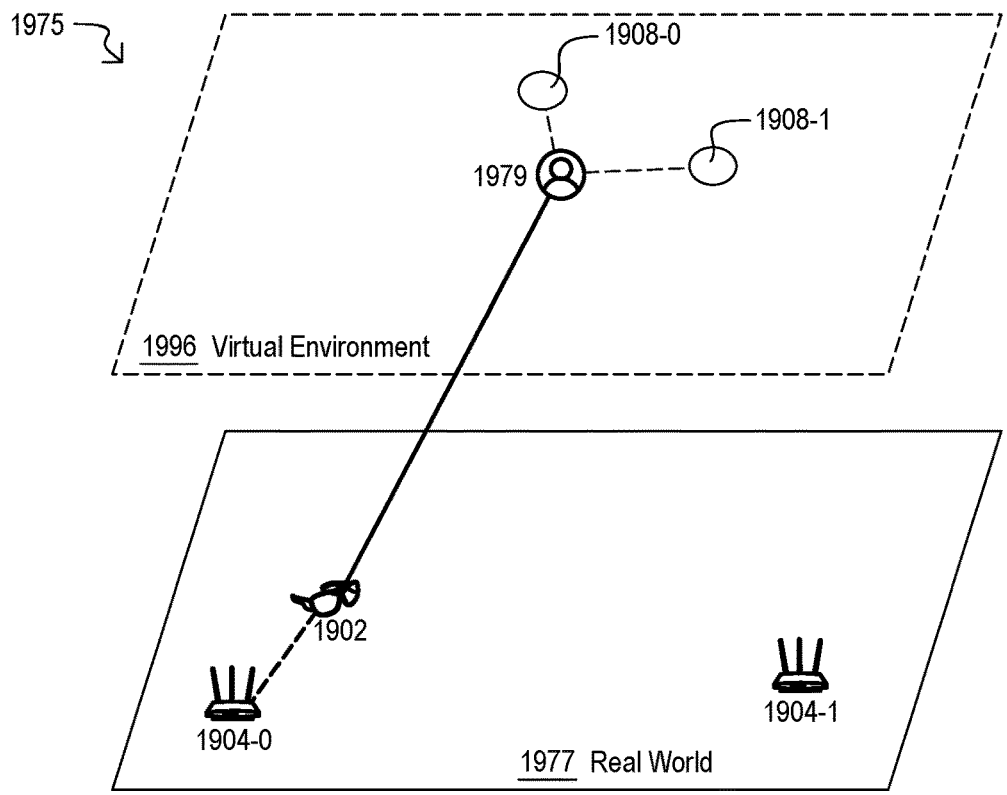
Figure 19D:
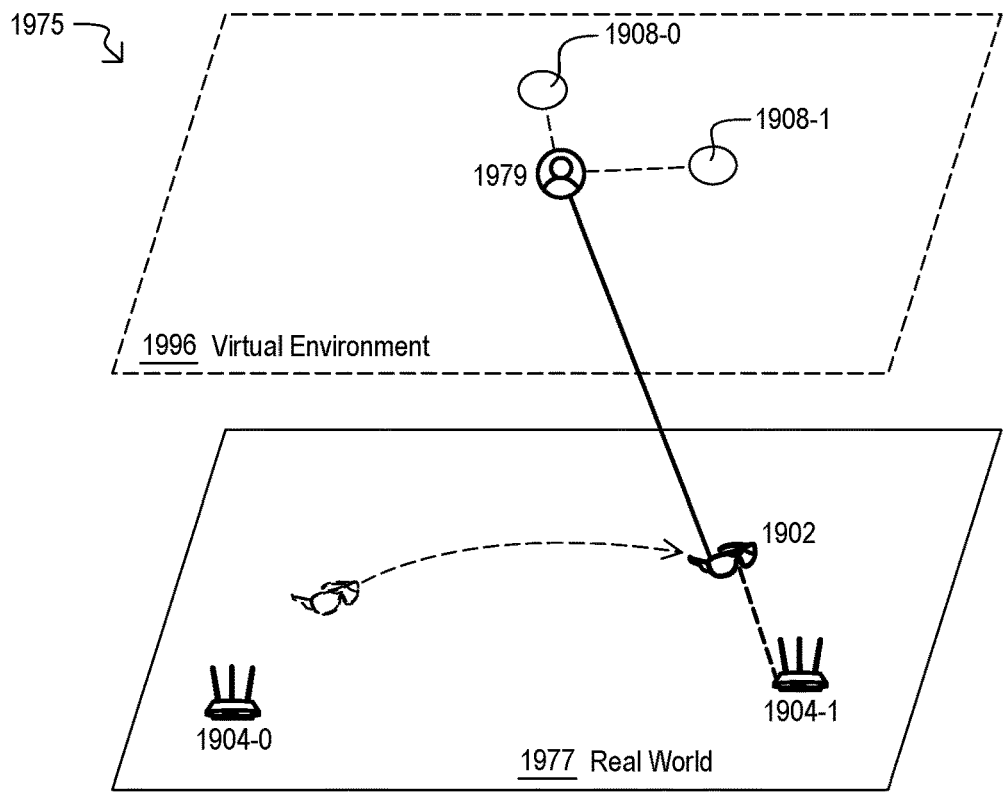

FIGS. 19C and 19D show how connections to real world devices can change as a user's real world location changes. FIG. 19C shows a V/AR environment 1996 that includes virtual wireless devices 1908-0 and 1908-1, and a real world environment 1977 that includes real world wireless devices 1904-0 and 1908-1, and V/AR access device 1902. A V/AR access device 1902 can be in physical proximity to real world wireless device 1904-0, and relay communications between real world wireless device 1904-0 and virtual wireless devices 1908-0/1.

FIG. 19D shows operations after a user has physically moved out of range of real world wireless device 1904-0, and into a range of real world wireless device 1904-1. V/AR access device 1902 can authenticate and establish a connection with real world wireless device 1904-1, and then relay communications with virtual wireless devices 1908-0/1.

While embodiments of FIGS. 19A to 19D have shown how operations can change when a user virtual position or V/AR access device real world position changes, it is understood that like changes can occur as virtual wireless devices change virtual position and/or real world wireless devices change real world position. That is, a V/AR access device can disconnect from a virtual wireless device if the virtual wireless device moves out of a predetermined virtual proximity and connects to a new virtual wireless device when as it moves into virtual proximity. Likewise, a V/AR access device can disconnect from a real world access device as it moves out of range and connect to real world access device as it moved within range.

In this way, as a user changes virtual location in a V/AR environment, a user can connect to virtual wireless devices that come within virtual proximity and disconnect from virtual wireless devices move out of virtual proximity. As a user moves in the real world, it can relay communications with virtual wireless devices from one real world device to another.

Embodiments can include methods, devices and systems that can include, by operation of a V/AR access device, receiving a list of virtual wireless devices within a predetermined virtual range of the V/AR access device, the virtual range based on a V/AR environment. The method can also include authenticating at least one virtual wireless device via packet transmissions and authenticating a real world wireless device. In response to an upstream data frame from the real world wireless device, encapsulating the upstream data frame, including its data link layer information, within an upstream packet and transmitting it to the virtual wireless device. In response to a downstream packet received from the virtual wireless device, decapsulating the downstream packet to access a downstream data frame, including its data link layer information, and transmitting the downstream data frame to the real world wireless device.

Embodiments can include methods, devices and systems that can include storage circuits configured to store a list of virtual wireless devices of a V/AR environment, the list including an indicated wireless communication standard for each virtual wireless device. Controller circuits can be configured to authenticate and connect with the virtual wireless devices of the list and authenticate and connect with at least one real world wireless device. Controller circuits can also, in response to an upstream data frame from the at least one real world wireless device, encapsulate the upstream data frame in an upstream network layer packet, including the upstream data frame data link layer information. Controller circuits can further, in response to a downstream packet from one of the virtual wireless devices, decapsulate the downstream packet to determine a downstream data frame, including data link layer information for the downstream data frame. Wireless circuits can be configured to transmit the authentication network packets, authentication data frames, the upstream packet, and the downstream data frame, and receive the downstream packet. The storage circuits, controller circuits and wireless circuits can be formed with a same integrated circuit substrate.

Embodiments can include methods, devices and systems that can include a VA/R access device configured to receive a list of virtual wireless devices within a predetermined virtual range of the V/AR access device within a V/AR environment, receive upstream data frames from at least one real world wireless device, encapsulate upstream data frames in upstream network layer packets to form upstream packets, the upstream packets retaining the data link layer information of the upstream data frames, receive downstream packets from at least one virtual wireless device, and decapsulate downstream packets to determine downstream data frames encapsulated therein, including the data link layer for the downstream data frames. An antenna system can be configured to transmit the downstream data frames and upstream packets and receive the upstream data frames and downstream packets.

Methods devices and systems according to embodiments can include the upstream and downstream packets that are compatible with at least one Internet Protocol. The upstream and downstream data frames can be compatible with at least one IEEE 802.11 wireless standard.

Methods devices and systems according to embodiments can include the upstream and downstream packets being compatible with at least one Internet Protocol. The upstream and downstream data frames can be compatible with at least one Bluetooth standard, including BLE.

Methods devices and systems according to embodiments can include the upstream and downstream packets and data frames being generated with a same integrated circuit device of the V/AR access device.

Methods devices and systems according to embodiments can include, by operation of a V/AR access device, determining a virtual location for the V/AR access device in a V/AR environment, and transmitting the virtual location in a network packet to the V/AR system.

Methods devices and systems according to embodiments can include, by operation of the V/AR access device, providing MAC addresses of real world wireless devices connected to the V/AR access device to the virtual wireless device via packet transmissions.

Methods devices and systems according to embodiments can include, by operation of the virtual wireless device, mapping network addresses to MAC addresses of real world wireless devices received from the V/AR access device. In response to receiving a data frame having destinations corresponding to one of the MAC addresses, the received data frame can be encapsulated into a downstream packet having the network address corresponding to V/AR access device and transmitted.

Methods devices and systems according to embodiments can include, by operation of the V/AR system, receiving the virtual location of the V/AR access device, generating the list of virtual wireless devices within a predetermined virtual range of the V/AR access device, and transmitting the list to the VA/R access device.

Methods devices and systems according to embodiments can include, controller circuits configured to encapsulate data frames compatible with a wireless standard selected from the group of: at least one IEEE 802.11 wireless standard and at least one Bluetooth standard, including BLE. Wireless circuits can include first radio circuits compatible with at least one IEEE 802.11 wireless standard, and second radio circuits compatible with at least one Bluetooth standard, including BLE.

Methods devices and systems according to embodiments can include controller circuits are configured to form upstream packets compatible with at least one Internet protocol; and decapsulate packets compatible with at least one Internet protocol.

Methods devices and systems according to embodiments can include controller circuits configured to determine a virtual location for the V/AR access device in a V/AR environment and transmit the virtual location in a network packet to a V/AR system.

Methods devices and systems according to embodiments can include a list of virtual wireless devices that indicates at least one communication standard for each virtual wireless device. At least one real world device can include communication circuits compatible with the at least one communication standard.

Methods devices and systems according to embodiments can include a V/AR access device is configured to generate a virtual location of the V/AR access device in a VA/R environment and transmit the virtual location in a packet to a V/AR system. A V/AR system can be configured to store an identity, virtual location and communication standard for each virtual wireless device, determine which virtual wireless devices are within the predetermined virtual range of the virtual location from the V/AR access device, and transmit the list of the virtual wireless devices to the V/AR access device.

Methods devices and systems according to embodiments can include a V/AR system configured to transmit display data for the V/AR environment, including representations of the virtual wireless devices. At least one real world device can include a display and is further configured to receive the display data and display the V/AR environment, including representations of virtual wireless devices within the predetermined virtual range.

Methods devices and systems according to embodiments can include a V/AR system configured to create an access instance corresponding to each authenticated and connected virtual wireless device, each access instance having a different network address. At least one virtual wireless device can be configured to maintain a data structure that includes a MAC address for real world devices connected to a same access instance.

Methods devices and systems according to embodiments can include a V/AR access device that is configured to periodically transmit a virtual location to a V/AR system, and request a list of virtual devices from the V/AR system. A V/AR system can be configured to generate a list of virtual wireless devices that are within a virtual proximity to the virtual location. The V/AR system can, in response to a request from the V/AR access device, transmit the list of virtual wireless devices to the V/AR access device.

Methods devices and systems according to embodiments can include a V/AR access device that is configured to transmit the list of virtual devices and a virtual location to a V/AR system. A V/AR system can be configured to notify the V/AR access device if any of the virtual wireless devices are out of a virtual proximity of the virtual location, and if any other virtual wireless devices are now within a virtual proximity of the virtual location.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
by operation of a virtual/augmented reality (V/AR) access device,
receiving a list of virtual wireless devices that includes, for each virtual wireless device, an identifier, a virtual range, and at least one of a plurality of real world communication standards,
authenticating at least one virtual wireless device via packet transmissions,
authenticating a real world wireless device,
in response to wirelessly receiving an upstream data frame from the real world wireless device for at least one of the virtual wireless devices, encapsulating the upstream data frame, including its data link layer information, within an upstream packet and transmitting the upstream packet to the virtual wireless device, and
in response to a downstream packet received from the virtual wireless device for the real world wireless device, decapsulating the downstream packet to access a downstream data frame, including its data link layer information, and wirelessly transmitting the downstream data frame to the real world wireless device according to a network data link layer protocol corresponding to the data link layer information; wherein
each virtual range is determined by a virtual position of the V/AR access device and a virtual position of the corresponding virtual device in a V/AR environment.

2. The method of claim 1, wherein:
the upstream and downstream packets are compatible with at least one Internet Protocol; and
the upstream and downstream data frames are compatible with at least one IEEE 802.11 wireless standard.

3. The method of claim 1, wherein:
the upstream and downstream packets are compatible with at least one Internet Protocol; and
the upstream and downstream data frames are compatible with at least one Bluetooth standard, including BLE.

4. The method of claim 1, wherein the upstream and downstream packets and data frames are generated with a same integrated circuit device of the V/AR access device.

5. The method of claim 1, further including:
by operation of the V/AR access device
determining a virtual location for the V/AR access device in a V/AR environment, and
transmitting the virtual location in a network packet to a V/AR system of the V/AR environment.

6. The method of claim 1, further including, by operation of the V/AR access device, providing MAC addresses of real world wireless devices connected to the V/AR access device to the virtual wireless device via packet transmissions.

7. The method of claim 6, further including:
by operation of the virtual wireless device,
mapping network addresses to MAC addresses of real world wireless devices received from the V/AR access device, and
in response to receiving a data frame having a destination corresponding to one of the MAC addresses, encapsulating the received data frame with a downstream packet having the network address corresponding to V/AR access device, and transmitting the downstream packet.

8. The method of claim 1, further including:
by operation of a V/AR system,
receiving the virtual location of the V/AR access device,
generating the list of virtual wireless devices within a predetermined virtual range of the V/AR access device, and
transmitting the list to the VA/R access device.

9. A device, comprising:

storage circuits configured to store a list of virtual wireless devices of a virtual/augmented reality (V/AR) environment, the list including an identifier, a virtual range, and at least one of a plurality of real world communication standards for each virtual wireless device;

controller circuits configured to
- authenticate and connect with the virtual wireless devices of the list
- authenticate and connect with at least one real world wireless device,
- in response to wirelessly receiving an upstream data frame from the at least one real world wireless device for at least one of the virtual wireless devices, encapsulate the upstream data frame in an upstream network layer packet, including the upstream data frame data link layer information, and
- in response to a downstream packet from one of the virtual wireless devices for the at least one real world wireless device, decapsulate the downstream packet to determine a downstream data frame, including data link layer information for the downstream data frame; and wireless circuits configured to wirelessly transmit authentication network packets, authentication data frames, the upstream network layer packet to the at least one virtual wireless device, and the downstream data frame to the at least one real world device according to a network data link layer protocol corresponding to the data link layer information, and receive the downstream packet; wherein the storage circuits, controller circuits and wireless circuits are formed with a same integrated circuit substrate, and each virtual range is determined by a virtual position of the V/AR access device and a virtual position of the corresponding virtual device in a V/AR environment.

10. The device of claim 9, wherein:

the controller circuits are configured to encapsulate data frames compatible with a wireless standard selected from the group of: at least one IEEE 802.11 wireless standard and at least one Bluetooth standard, including BLE; and the wireless circuits comprise
- first radio circuits compatible with at least one IEEE 802.11 wireless standard, and
- second radio circuits compatible with at least one Bluetooth standard, including BLE.

11. The device of claim 9, wherein:

the controller circuits are configured to
- form upstream network layer packets compatible with at least one Internet protocol; and
- decapsulate packets compatible with at least one Internet protocol.

12. The device of claim 9, wherein:

the controller circuits are further configured to
- determine a virtual location for the V/AR access device in a V/AR environment, and
- transmit the virtual location in a network packet to a VAR system.

* * * * *